US011722704B2

(12) United States Patent
Andrivon et al.

(10) Patent No.: US 11,722,704 B2
(45) Date of Patent: Aug. 8, 2023

(54) DECODING AN IMAGE

(71) Applicant: InterDigital VC Holdings, Inc., Wilmington, DE (US)

(72) Inventors: Pierre Andrivon, Liffre (FR); Marie-Jean Colaitis, Cesson-Sévigné (FR); David Touze, Rennes (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 17/415,959

(22) PCT Filed: Dec. 17, 2019

(86) PCT No.: PCT/US2019/066927
§ 371 (c)(1),
(2) Date: Jun. 18, 2021

(87) PCT Pub. No.: WO2020/131920
PCT Pub. Date: Jun. 25, 2020

(65) Prior Publication Data
US 2022/0086507 A1 Mar. 17, 2022

(30) Foreign Application Priority Data
Dec. 21, 2018 (EP) .................................... 18306786

(51) Int. Cl.
*H04N 19/98* (2014.01)
*H04N 19/85* (2014.01)
(52) U.S. Cl.
CPC ............. *H04N 19/98* (2014.11); *H04N 19/85* (2014.11)

(58) Field of Classification Search
CPC ........ H04N 19/98; H04N 19/85; H04N 19/46; H04N 1/6058
See application file for complete search history.

(56) References Cited

U.S. PATENT DOCUMENTS 10,834,400 B1 * 11/2020 Topiwala ............... H04N 19/46
2016/0104438 A1 4/2016 Han et al.
(Continued)

FOREIGN PATENT DOCUMENTS

EP        3297288 B1 * 10/2020    ......... H04N 21/2362
WO   WO 2013046095 A1   4/2013
(Continued)

OTHER PUBLICATIONS

Anonymous, "SMPTE Standard—Dynamic Metadata for Color Volume Transformation—Application #1", Society of Motion Picture and Television Engineers, SMPTE ST 2094-10:2016, May 18, 2016, 15 pages.
(Continued)

*Primary Examiner* — Tracy Y. Li
(74) *Attorney, Agent, or Firm* — Condo Roccia Koptiw LLP

(57) ABSTRACT

A method for decoding an image enables to preserve artistic intent at the final rendering stage by adjusting the image to luminance characteristics of the content and of the presentation display that will display the image. Values representative of luminance of both the image and the display device are obtained. Parameters of a display adaptation function are adjusted according to these values and the adjusted display adaptation function is used to decode the image. In at least one embodiment, the adjusted display adaptation function relates to a tone mapping function. Corresponding apparatus implementing the method is also described.

11 Claims, 9 Drawing Sheets

(56) References Cited

U.S. PATENT DOCUMENTS

| | | | |
|---|---|---|---|
| 2016/0210730 A1 | 7/2016 | Eto et al. | |
| 2016/0381335 A1 | 12/2016 | Tao et al. | |
| 2019/0045091 A1 | 2/2019 | Hamada et al. | |
| 2019/0279343 A1* | 9/2019 | Shin | G09G 3/20 |
| 2019/0295454 A1* | 9/2019 | Urabe | G09G 3/22 |

FOREIGN PATENT DOCUMENTS

| | | |
|---|---|---|
| WO | WO 2016017058 A1 | 2/2016 |
| WO | WO 2017051612 A1 | 3/2017 |

OTHER PUBLICATIONS

Anonymous, "ULTRA HD Blu-ray Video Parameters Liasion Information", Blu-Ray Disc Association, Mar. 2015, 15 pages.

Samuelsson et al, "Conversion and Coding Practices for HDR/WCG UCbCr 4:2:0 Video with PQ Transfer Characteristics (Draft 4)", Joint Collaberative Team on Video Coding (JCT-VC) of ITU-T SG 16 WP 3 and ISO/IEC JTC 1/SC 29/WG 11, Document: JCTVC-Z1017, 26th Meeting: Geneva, Switzerland, Jan. 12, 2017, 30 pages.

Anonymous, "Mastering Display Color Volume Metadata Supporting High Luminance and Wide Color Gamut Images", The Society of Motion Picture and Television Engineers (SMPTE), SMPTE ST 2086:2014, Oct. 13, 2014, 6 pages.

Anonymous, "Commission Regulation (EC) No. 642/2009 of Jul. 22, 2009 implementing Directive 2005/32/EC of the European Parliament and of the Council with regard to ecodesign requirements for televisions", Official Journal of the European Union, Jul. 23, 2009, 11 pages.

Fogg et al, "Content Light Level Information SEI", Joint Collaborative Team on Video Coding (JCT-VC) of ITU-T SG 16 WP 3 and ISO/IEC JTC 1/SC 29/WG 11, Document: JCTVC-T0101r3, 20th Meeting: Geneva, Switzerland, Feb. 10, 2015, 3 pages.

Anonymous, "Advanced Video Coding for Generic Audiovisual Services", Telecommunication Standardization Sector of ITU, Series H: Audiovisual and Multimedia Systems, Infrastructure of audiovisual services—Coding of moving video, Recommendation ITU-T H.264, Apr. 2017, 812 pages.

Anonymous, "Operational practices in HDR television production", International Telecommunication Union, ITU-R Radiocommunication Sector of ITU, Report ITU-R BT.2408-0, Oct. 2017, 19 pages.

Anonymous, "Dynamic Metadata for Color Volume Transformation Application #3", The Society of Motion Picture and Television Engineers (SMPTE), SMPTE ST 2094-30:201x WD Standard, Version 3, Oct. 8, 2015, 13 pages.

Anonymous, "High Efficiency Video Coding", Telecommunication Standardization Sector of ITU, Series H: Audiovisual and Multimedia Systems, Infrastructure of audiovisual services—Coding of moving video, Recommendation ITU-T H.265, Feb. 2018, 692 pages.

Anonymous, "High-Performance Single Layer High Dynamic Range (HDR) System for use in Consumer Electronics devices; Part 2: Enhancements for Perceptual Quantization (PQ) transfer function based High Dynamic Range (HDR) Systems (SL-HDR2)", ETSI and European Broadcasting Union, ETSI TS 103 433-2 V1.1.1, Jan. 2018, 45 pages.

Zink et al, "Managing HDR Content Production and Display Device Capabilities", IBC 2015 Conference, Amsterdam, Netherlands, Sep. 10, 2015, 11 pages.

Anonymous, "Dynamic Metadata for Color Volume Transform Application #4", The Society of Motion Picture and Television Engineers (SMPTE), SMPTE ST 2094-40:2020, SMPTE Standard, Apr. 9, 2020, 29 pages.

Anonymous, "A DTV Profile for Uncompressed High-Speed Digital Interfaces: CTA-861-G", Consumer Technology Association, CTA Technology & Standards Department, Nov. 2017, 218 pages.

Anonymous, "High-Performance Single Layer High Dynamic Range (HDR) System for use in Consumer Electronics devices; Part 1: Directly Standard Dynamic Range (SDR) Compatible HDR System (SL-HDR1)", European Telecommunications Standards Institute, ETSI TS 103 433 V1.2.1, Aug. 2017, 123 pages.

Anonymous, "High Dynamic Range Electro-Optical Transfer Function of Mastering Reference Displays", Society of Motion Picture and Television Engineers, SMPTE ST 2084:2014, Aug. 16, 2014, 14 pages.

Diaz et al., "Integrating HEVC Video Compression with a High Dynamic Range Video Pipeline", SMPTE Motion Imaging Journal, vol. 125, Issue No. 1, Jan. 2016, pp. 14-21.

Anonymous, "High Efficiency Video Coding", ITU-T Telecommunication Standardization Section of ITU, Series H: Audiovisual and Multimedia Systems, Infrastructure of audiovisual services—Coding of moving video, Recommendation ITU-T H.265, Dec. 2016, 664 pages.

Pytlarz et al. "Real Time Cross-Mapping of High Dynamic Range Images", IBC 2016 Conference, Amsterdam, Netherlands, Sep. 8, 2016; 10 pages.

ITU-R, "Operational Practices in HDR Television Production", International Telecommunication Union, ITU-R Radiocommunication Sector of ITU, Recommendation ITU-R BT.2408-1, Apr. 2018, 35 pages.

IEEE, "IEEE Standard for Second-Generation IEEE 1857 Video Coding", IEEE Std. 1857.4™—2018, IEEE Standards Association, IEEE Computer Society, 2018, 199 pages.

ITU-R, "Image Parameter Values for High Dynamic Range Television for Use in Production and International Programme Exchange", Recommendation ITU-R BT.2100-1, BT Series, Broadcasting Service (Television), Geneva, Jun. 2017, 16 pages.

ITU-R, "Parameter Values for the HDTV Standards for Production and International Programme Exchange", Recommendation ITU-R BT.709-6, BT Series, Broadcasting Service (Television), Geneva, Jun. 2015, 19 pages.

ITU-R, "Parameter Values for Ultra-High Definition Television Systems for Production and International Programme Exchange", Recommendation ITU-R BT.2020-2, BT Series, Broadcasting Service (Television), Geneva, Oct. 2015, 8 pages.

* cited by examiner

DECODING AN IMAGE

CROSS REFERENCE TO RELATED APPLICATIONS

This application is the national stage entry under 35 U.S.C. § 371 of International Application PCT/US2019/066927, filed Dec. 17, 2019, which was published in accordance with PCT Article 21(2) on Jun. 25, 2020, in English, and which claims the benefit of European Patent Application No. 18306786.7, filed Dec. 21, 2018.

FIELD

At least one embodiment relates generally to distributing video while preserving high fidelity of resulting images and at least one embodiment particularly relates to decoding the image using a function determined to adjust the image to luminance characteristics of the content and of presentation display that will display the image.

BACKGROUND

The present section is intended to introduce the reader to various aspects of art, which may be related to various aspects of at least one embodiment that is described and/or claimed below. This discussion is believed to be helpful in providing the reader with background information to facilitate a better understanding of the various aspects of at least one embodiment.

The advent of the High Efficiency Video Coding (HEVC) standard (ITU-T H.265 Telecommunication standardization sector of ITU (02/2018), series H: audiovisual and multimedia systems, infrastructure of audiovisual services—coding of moving video, High efficiency video coding, Recommendation ITU-T H.265) enables the deployment of new video services with enhanced viewing experience, such as Ultra HD services. In addition to an increased spatial resolution, Ultra HD format can bring a wider color gamut (WCG) and a higher dynamic range (HDR) than respectively the Standard Color Gamut (SCG) and the Standard Dynamic Range (SDR) of High Definition format currently deployed. Different solutions for the representation and coding of HDR/WCG video have been proposed such as the perceptual transfer function Perceptual Quantizer (PQ) (SMPTE ST 2084, "High Dynamic Range Electro-Optical Transfer Function of Mastering Reference Displays, or Diaz, R., Blinstein, S. and Qu, S. "Integrating HEVC Video Compression with a High Dynamic Range Video Pipeline", SMPTE Motion Imaging Journal, Vol. 125, Issue 1. February, 2016, pp 14-21). Typically, SMPTE ST 2084 allows representing HDR video signal of up to 10 000 cd/m² peak luminance with only 10 or 12 bits.

SDR backward compatibility with a decoding and rendering apparatus is an important feature in some video distribution systems, such as broadcasting or multicasting systems. A solution based on a single-layer coding/decoding process may be backward compatible, for example SDR compatible, and may leverage legacy distribution networks and services already in place.

Such a single-layer based distribution solution enables both high quality HDR rendering on HDR-enabled Consumer Electronic (CE) devices, while also offering high quality SDR rendering on SDR-enabled CE devices. Such a solution is based on an encoded signal, for example SDR signal, and associated metadata (typically only using a few bytes per video frame or scene) that can be used to reconstruct another signal, for example either SDR or HDR signal, from a decoded signal.

An example of a single-layer based distribution solution may be found in the ETSI technical specification TS 103 433-1 V1.2.1 (August 2017). Such a single-layer based distribution solution is denoted SL-HDR1 in the following.

Additionally, HDR distribution systems (workflows, but also decoding and rendering apparatus) may already be deployed. Indeed, there are a number of global video services providers which include HDR content. However, distributed HDR material may be represented in a format or with characteristics which do not match consumer end-device characteristics. Usually, the consumer end-device adapts the decoded material to its own characteristics. However, the versatility of technologies employed in the HDR TV begets important differences in terms of rendition because of the differences between the consumer end-device characteristics compared to the mastering display used in the production environment to grade the original content. For a content producer, artistic intent fidelity and its rendition to the consumer are of the utmost importance. Thus, "display adaptation" metadata can be generated either at the production stage during the grading process, or under the control of a quality check operator before emission. The metatdata enable the conveyance of the artistic intent to the consumer when the decoded signal is to be adapted to end-device characteristics.

An example of a single-layer based distribution solution combined with display adaptation may be found in ETSI technical specification TS 103 433-2 V1.1.1 (January 2018). Such a single-layer based distribution solution is denoted SL-HDR2 in the following.

Such a single-layer based distribution solution, SL-HDR1 or SL-HDR2, generates metadata as parameters used for the reconstruction of the signal. Metadata may be either static or dynamic.

Static metadata means parameters representative of the video content or its format that remain the same for, for example, a video (set of images) and/or a program.

Static metadata are valid for the whole video content (scene, movie, clip . . . ) and may depend on the image content per se or the representation format of the image content. The static metadata may define, for example, image format, color space, or color gamut. For instance, SMPTE ST 2086:2014, "Mastering Display Color Volume Metadata Supporting High Luminance and Wide Color Gamut Images" defines static metadata that describes the mastering display used to grade the material in a production environment. The Mastering Display Colour Volume (MDCV) SEI (Supplemental Enhanced Information) message corresponds to ST 2086 for both H.264/AVC ("Advanced video coding for generic audiovisual Services", SERIES H: AUDIOVISUAL AND MULTIMEDIA SYSTEMS, Recommendation ITU-T H.264, Telecommunication Standardization Sector of ITU, April 2017) and HEVC video codecs.

Dynamic metadata is content-dependent information, so that metadata could change with the image/video content, for example for each image or for each group of images. As an example, SMPTE ST 2094:2016, "Dynamic Metadata for Color Volume Transform" defines dynamic metadata typically generated in a production environment. SMPTE ST 2094-30 can be distributed in HEVC and AVC coded video streams using, for example, the Colour Remapping Information (CRI) SEI message.

The display adaptation method documented in Annex E of ETSI TS 103 433-1 v1.2.1 and clause 7 of ETSI TS 103 433-2 v1.1.1 only uses the peak luminance of the presentation display to control the tone mapping operation (or its inverse) required in the display adaptation process (see clause E.2 from TS 103 433-1 v1.2.1 as an example). The other tone mapping control parameters are determined from content analysis and the characteristics of the mastering display used to grade the HDR content. However, displays (esp. consumer HDR ones) have to implement power consumption regulatory policies (https://eur-lex.europa.eu/LexUriServ/LexUriServ.do?uri=OJ:L:2009:191:0042:0052:EN:PDF) for energy saving and their luminance/brightness is adapted according to the surface, distribution and values of bright pixels to display to prevent an excessive power consumption. The application of such policies impacts the rendition of the picture. Without consideration of these characteristics of a given display, rendition of the display adapted picture may not be conforming to the expected look (i.e. display adapted picture rendition is not the same as worked out in the production facilities on professional equipment) since the brightness in a real situation may be far lower than the peak luminance.

Luminance is expressed by the unit candela per square meter ($cd/m^2$). This unit supersedes the term "nit" which may also be used (although it is deprecated in the International System of Units).

For example, an image of a night sky may comprise mainly black pixels (night—around few nits) and a few set of very bright pixels (starlights—800 nits). In this case, the peak luminance of the content may be reaching 800 nits. If the display can achieve this peak luminance, then the highlights of the image (starlights) will likely be displayed correctly at 800 nits. However, in the case of a very bright image (for example a scene representing a market at noon in the South of France (average luminance of 300 nits on the whole picture) with specular lights bouncing on a Cadillac chrome (800 nits) or an explosion or a fade-to-white effect . . . ), the consumer display will likely not be able to display the peak luminance at its maximum peak luminance capabilities (800 nits in the example) while respecting the power consumption regulation. Indeed, actual peak luminance of the presentation display depends at least on the surface of (highly) bright areas to represent.

Thus, display adaptation technics (possibly metadata-guided) which only consider as a unique characteristic the peak luminance of the presentation display may not represent satisfactorily the artistic intent as approved at the production stage due to the inconsideration of the power management policy of the display device.

SUMMARY

The following presents a simplified summary of at least one embodiment in order to provide a basic understanding of some aspects of at least one embodiment. This summary is not an extensive overview of an embodiment. It is not intended to identify key or critical elements of an embodiment. The following summary merely presents some aspects of at least one embodiment in a simplified form as a prelude to the more detailed description provided elsewhere in the application.

According to a general aspect of at least one embodiment, there is provided a method for decoding a image enabling artistic intent preservation at the final rendering stage by adjusting the image to the luminance or brightness characteristics of the content and of the presentation display that will display the image. Luminance values representative of both the content image and the presentation display device are obtained. Parameters of a display adaptation function are adjusted according to these values, thus determining an adjusted display adaptation function that is used within the image decoding process. In at least one embodiment, the adjusted display adaptation function is a tone mapping function.

In a first aspect, the disclosure is directed to a method for decoding an image comprising obtaining a first value representative of a luminance parameter of a display device that will display the image, obtaining a second value representative of luminance parameter of the image to be displayed, and decoding the image using an adapting function whose parameters are adjusted according to the first and the second value.

In a second aspect, the disclosure is directed to an apparatus for decoding an image comprising a processor configured to obtain a first value representative of a luminance parameter of a display device that will display the image, obtain a second value representative of luminance parameter of the image to be displayed, and decode the image using an adapting function whose parameters are adjusted according to the first and the second value.

In a third aspect, the disclosure is directed to a computer program product comprising program code instructions to execute the steps of the method according to the first aspect when this program is executed on a computer.

In a fourth aspect, the disclosure is directed to a non-transitory processor-readable medium whose program code instructions to execute the steps of the method according to the first aspect when this program is executed on a computer.

The specific nature of the present principles as well as other objects, advantages, features and uses of the present principles will become evident from the following description of examples taken in conjunction with the accompanying drawings.

DESCRIPTION OF EXAMPLE OF THE PRESENT PRINCIPLES

Figure 1:
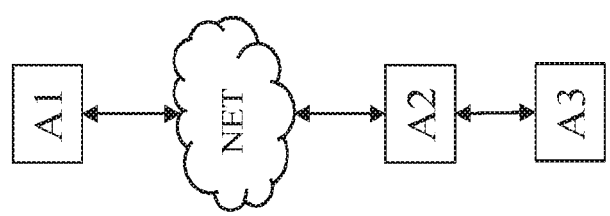
FIG. 1 shows a high-level representation of an end-to-end workflow supporting content delivery for displaying with an improved display adaptation feature in accordance with at least one embodiment.

At least one embodiment is described more fully hereinafter with reference to the accompanying figures, in which examples of at least one embodiment are shown. An embodiment may, however, be embodied in many alternate forms and should not be construed as limited to the examples set forth herein. Accordingly, it should be understood that there is no intent to limit embodiments to the particular forms disclosed. On the contrary, the disclosure is intended to cover all modifications, equivalents, and alternatives falling within the spirit and scope of of this application as defined by the claims.

The terminology used herein is for the purpose of describing particular examples only and is not intended to be limiting. As used herein, the singular forms "a", "an", and "the" are intended to include the plural forms as well, unless the context clearly indicates otherwise. It will be further understood that the terms "includes" and/or "including" when used in this specification, specify the presence of stated, for example, features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as "/". It will be understood that, although the terms first, second, etc. may be used herein to describe various elements, these elements are not be limited by these terms. These terms are only used to distinguish one element from another. For example, a first element could be termed a second element, and, similarly, a second element could be termed a first element without departing from the teachings of this application. Although some of the diagrams include arrows on communication paths to show a primary direction of communication, it is to be understood that communication may occur in the opposite direction to the depicted arrows. Some examples are described with regard to block diagrams and operational flowcharts in which each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved. Reference herein to "in accordance with an example" or "in an example" means that a particular feature, structure, or characteristic described in connection with the example can be included in at least one implementation. The appearances of the expression "in accordance with an example" or "in an example" in various places in the specification are not necessarily all referring to the same example, nor are separate or alternative examples necessarily mutually exclusive of other examples. Reference numerals appearing in the claims are by way of illustration only and shall have no limiting effect on the scope of the claims. Although not explicitly described, the present examples and variants may be employed in any combination or sub-combination.

In the following, image data refer to data, for example, one or several arrays of samples (for example, pixel values) in a specific image/video format, which specifies information pertaining to the pixel values of an image (or a video) and/or information which may be used by a display and/or any other apparatus to visualize and/or decode an image (or video) for example. An image typically includes a first component, in the shape of a first array of samples, usually representative of luminance (or luma) of the image, and a second component and a third component, in the shape of other arrays of samples, usually representative of the chrominance (or chroma) of the image. Some embodiments represent the same information using a set of arrays of color samples, such as the traditional tri-chromatic RGB representation.

A pixel value is represented in one or more embodiments by a vector of C values, where C is the number of components. Each value of a vector is typically represented with a number of bits which can define a dynamic range of the pixel values.

Standard Dynamic Range images (SDR images) are images whose luminance values are typically represented with a smaller number of bits (typically 8) than in High Dynamic Range images (HDR images). The difference between the dynamic ranges of SDR and HDR images is therefore relative, and SDR images can have, for example, more than 8 bits. Because of the smaller number of bits, SDR images often do not allow correct rendering of small signal variations, in particular in dark and bright luminance ranges. In HDR images, the signal representation is typically extended to maintain a higher accuracy of the signal over all or part of its range. For example, at least one embodiment represents an HDR image using 10-bits for luminance, and provides 4 times as many values than an 8-bit representation. The additional values allow a greater luminance range to be represented, and can also allow finer differences in luminance to be represented. In HDR images, pixel values are usually represented in floating-point format (typically at least 10 bits per component, namely float or half-float), the most popular format being openEXR half-float format (for example 48 bits per pixel) or in integers with a long representation, typically at least 16 bits.

Typically, two different images have a different dynamic range of the luminance. The dynamic range of the luminance of an image is the ratio of the maximum over the minimum of the luminance values of the image.

Typically, when the dynamic range of the luminance of an image is below 1000 (for example 500: for example, 100 $cd/m^2$ over 0.2 $cd/m^2$), the image is denoted as a Standard Dynamic Range (SDR) image and when the dynamic range of the luminance of an image is equal to or greater than 1000 (for example 10000: for example, 1000 $cd/m^2$ over 0.1 $cd/m^2$) the image is denoted as an HDR image. Luminance is expressed by the unit candela per square meter ($cd/m^2$). This unit supersedes the term "nit" which may also be used.

At least one embodiment is described for pre-processing, encoding, decoding, and post-processing an image but extends to pre-processing, encoding, decoding, and post-processing a sequence of images (video) because each image of the sequence is sequentially pre-processed, encoded, decoded, and post-processed as described below.

In the following, a component $C_n^m$ designates a component m of an image n. These components $\{C_n^m\}$ with m=1, 2, 3, represent an image $I_n$ in a specific image format. Typically, an image format is characterized by a color volume (for example chromaticity and dynamic range), and a color encoding system (for example RGB, YCbCr . . . ).

Figure 6:
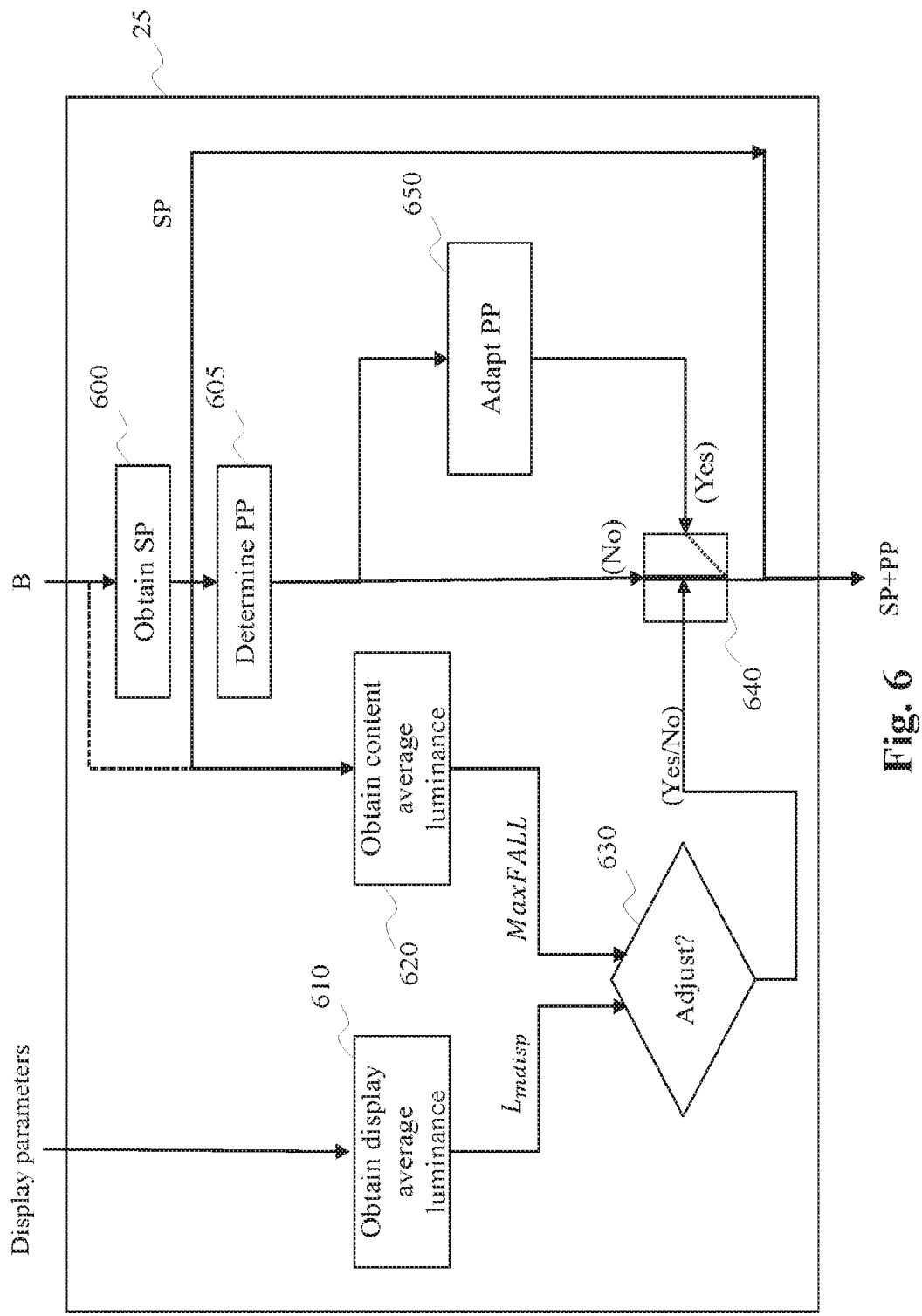
FIG. 6 illustrates an example of embodiment for adjusting the display adaption function according to content maximal average luminance and presentation display maximal average luminance.
Figure 7:
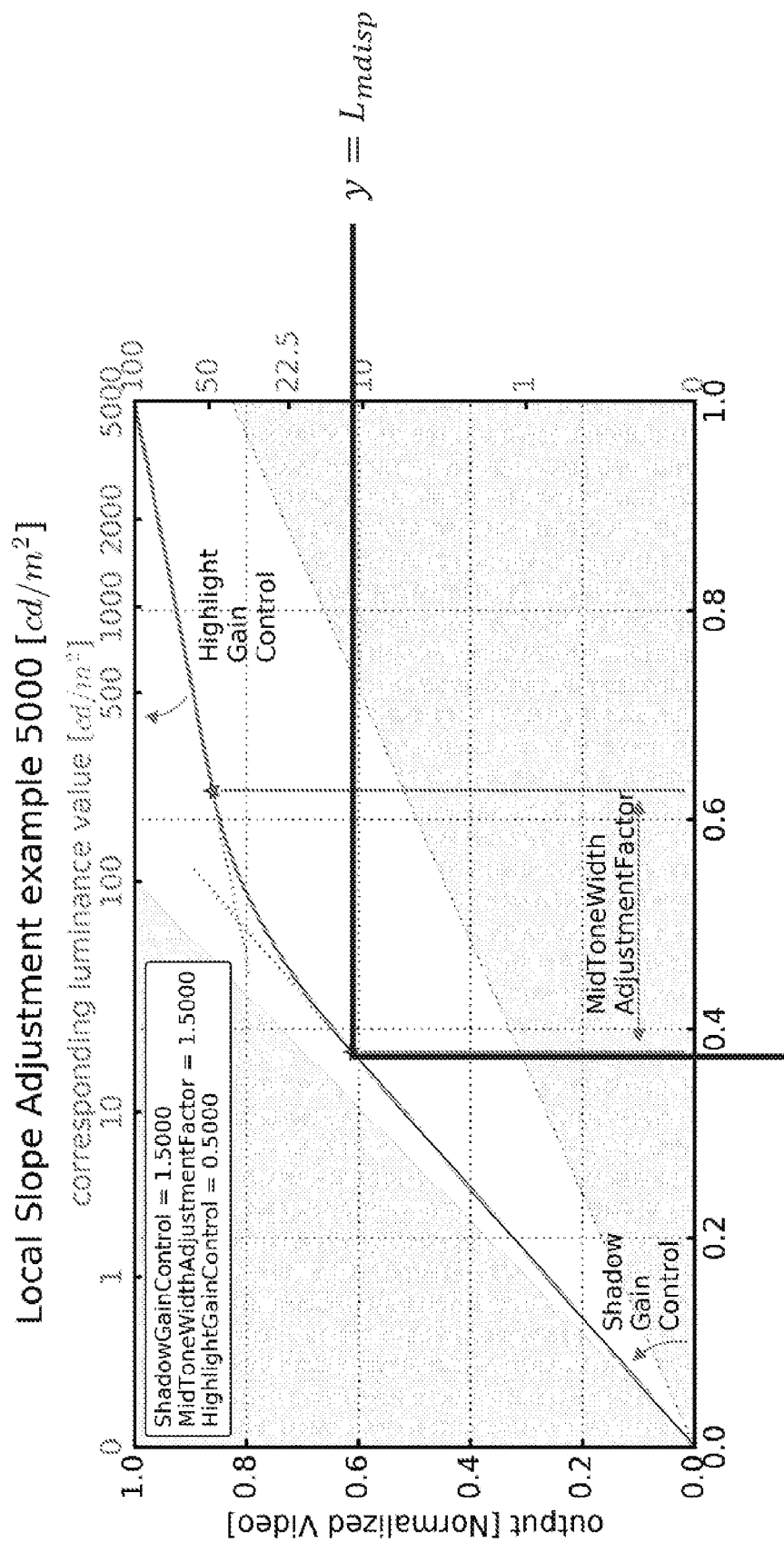
FIG. 7 illustrates the adjustment of a tone mapping curve according to a second embodiment where content maximal average luminance and display maximal average luminance are matched.

According to at least one embodiment, there is provided a method for decoding a image enabling artistic intent preservation at the final rendering stage by adjusting the image to luminance characteristics of the content and of the presentation display, as detailed in FIGS. 6 and 7.

FIG. 1 shows a high-level representation of an end-to-end workflow supporting content delivery for displaying with an improved display adaptation feature in accordance with at least one embodiment. FIG. 1 includes an apparatus A1. The apparatus A1 is configured to implement a method for pre-processing and encoding an image or a video stream. FIG. 1 also includes an apparatus A2. The apparatus A2 is configured to implement a method for decoding and post-processing an image or video stream as described below. FIG. 1 also includes an apparatus A3. The apparatus A3 communicates with apparatus A2 and is configured to display the decoded and post-processed image or video stream.

FIG. 1 also includes a distribution network NET. The two remote apparatuses A1 and A2 are communicating over the distribution network NET that is configured at least to provide the encoded image or video stream from apparatus A1 to apparatus A2.

Apparatus A1 includes at least one device configured to implement a pre-processing and/or encoding method as described herebelow. The at least one device belongs to a set of devices including, for example, a mobile device, a communication device, a game device, a tablet (or tablet computer), a computer device such as a laptop, a still image camera, a video camera, an encoding chip, a still image server, and a video server (for example a broadcast server, a video-on-demand server, or a web server).

Apparatus A2 includes at least one device configured to implement a decoding and/or post-processing method as described herebelow.

Apparatus A3 includes at least one device configured to implement a displaying method.

The at least one device included in apparatus A1, A2 or A3 belongs to a set of devices including, for example, a mobile device, a communication device, a game device, a computer device, a set top box, a TV set (or television), a tablet (or tablet computer), a computer device such as a laptop, a display, a head-mounted display and a rendering/displaying chip.

In accordance with an example, the network is a broadcast network, adapted to broadcast still images or video images from apparatus A1 to a plurality of apparatuses A2. DVB-based and ATSC-based networks are examples of such broadcast networks.

In accordance with another example, the network is a broadband network adapted to deliver still images or video images from apparatus A1 to a plurality of apparatuses A2. Internet-based networks, GSM networks, or TV over IP networks are examples of such broadband networks.

In an embodiment, the end-to-end workflow uses a broadcast server for apparatus A1, a set-top box for apparatus A2, a television set for apparatus A3, and a DVB terrestrial broadcast network.

In an alternate embodiment, apparatus A2 and A3 are combined in a single device, for example a television integrating set top box decoding and post-processing functionalities.

In an alternate embodiment, the distribution network NET is replaced by a physical packaged media on which the encoded image or video stream is stored.

Physical packaged media include, for example, optical packaged media such as Blu-ray disc and Ultra-HD Blu-ray, and memory-based package media such as used in OTT and VoD services.

The distribution network NET of FIG. 1 can support delivery to HDR and SDR CE displays. For example, apparatus A1 provides HDR and/or SDR content to be delivered over the network NET, apparatus A2 received the delivered HDR and or SDR content and apparatus A3 (CE displays) displays the HDR or SDR content.

Figure 2:
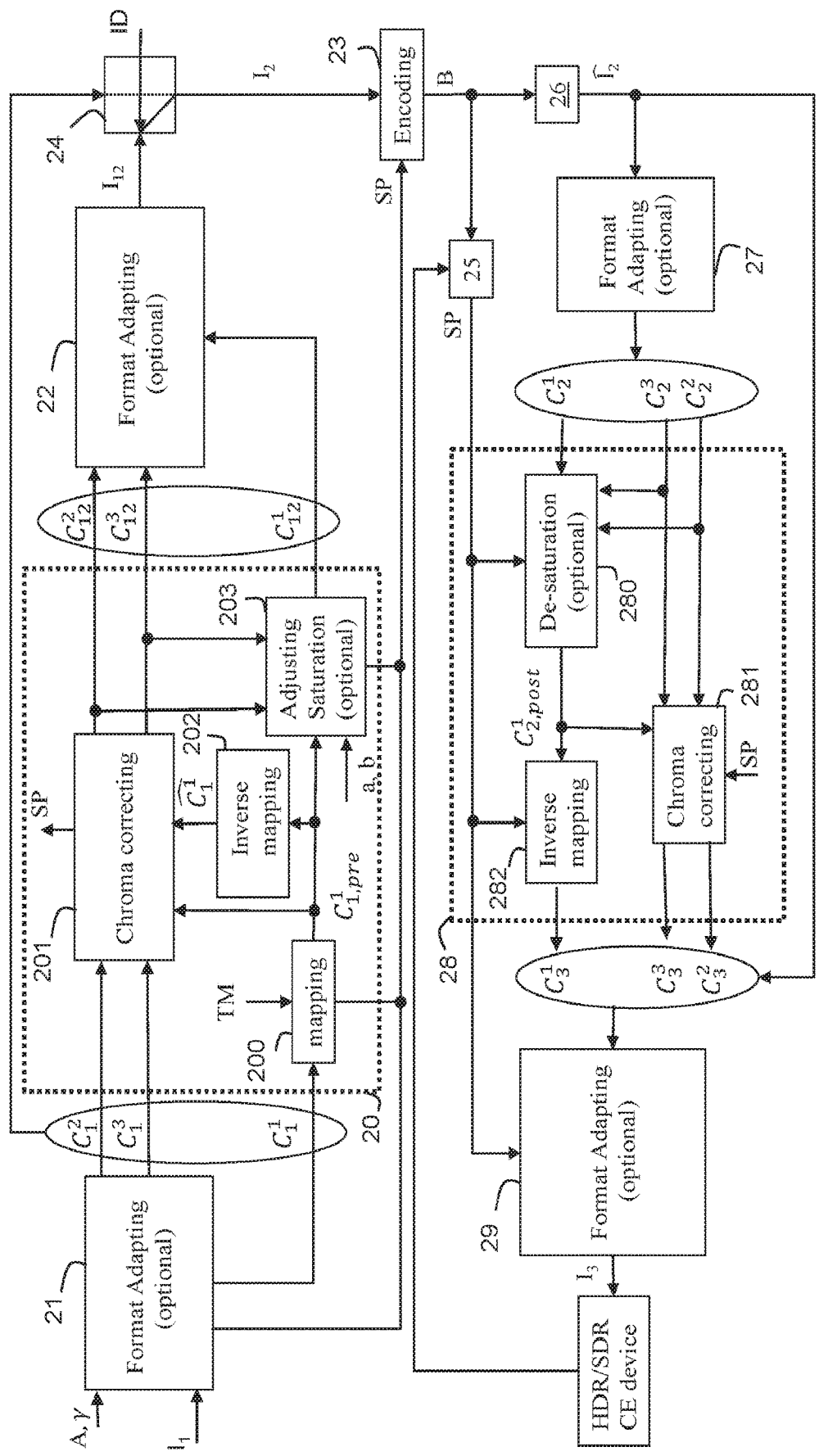
FIG. 2 shows an example of an end-to-end processing workflow supporting delivery to HDR and SDR CE displays in accordance with a single-layer based distribution solution.

FIG. 2 shows an example of an end-to-end processing workflow supporting delivery to HDR and SDR CE displays in accordance with a single-layer based distribution solution.

Such a single-layer based distribution solution may address SDR direct backward compatibility. That is, the solution leverages SDR distribution networks and services already in place and enables high-quality HDR rendering on HDR-enabled CE devices including high-quality SDR rendering on SDR CE devices.

SL-HDR1 is one example of such a single-layer based distribution solution.

Such a single-layer based distribution solution may also relate to a solution used on distribution networks for which display adaptation dynamic metadata are delivered. This allows, for example, the content to be adapted to a user's display. For example, dynamic metadata can be delivered along with a PQ HDR video signal. PQ means "Perceptual Quantization" as specified in Rec. ITU-R BT.2100 "Recommendation ITU-R BT.2100-1, image parameter values for high dynamic range television for use in production and international programme exchange".

The workflow shown in FIG. 2 involves a single-layer based distribution solution with associated SL-HDR metadata. Such a method illustrates an example of the use of a method for reconstructing three components $\{C_{30}^m\}$ representative of three components $\{C_{10}^m\}$ of an input image. Such a reconstruction is based on three decoded components $\{\widehat{C_{20}^m}\}$ representative of a decoded image and the metadata as specified, for example, in SL-HDR1 or SL-HDR2.

An information data ID determines which of the single-layer based distribution solutions (for example SL-HDR1 or SL-HDR2) is used. Usually, in practice only one single-layer based distribution solution is used and the information data ID is a fixed value. If more than one single-layer based distribution solution can be used, then the information data ID indicates which of these single-layer based distribution solutions is used.

Typically, SL-HDR1 and SL-HDR2 may be used and the information data ID indicates if either SL-HDR1 or SL-HDR2 has to be used.

As shown, the single-layer based distribution solution shown in FIG. 2 includes a pre-processing step 20, an encoding step 23, decoding steps 25 and 26, and a post-processing step 28.

The input and the output of the pre-processing step 20 are triplets of components $\{\{C_1^m\}$ and $\{C_{12}^m\}$ respectively, and the input and the output of the post-processing step 28 are triplets of components $\{\{C_2^m\}$ and $\{C_3^m\}$ respectively.

The single-layer based distribution solution shown in FIG. 2 may include optional format adaptation steps 21, 22, 27, 29 to adapt the format of three components $\{C_n^m\}$ to the input of a further processing to be applied on these components.

For example, in step 21 (optional), the format of the three components $\{C_{10}{}^m\}$ may be adapted to a format fitting an input format of the pre-processing step 20 or an input format of an encoding step 23. In step 22 (optional), the format of the three components $\{C_{12}{}^m\}$ may be adapted to a format fitting the input format of the encoding step 23.

In step 27 (optional), the format of the three components $\{\widehat{C_{20}^m}\}$ may be adapted to a format fitting the input of the post-processing step 28, and in step 29, the format of the three components $\{C_3{}^m\}$ may be adapted to a format that may be defined from at least one characteristic of a targeted apparatus 30 (for example a Set-Top-Box, a connected TV, HDR/SDR enabled CE device, an Ultra HD Blu-ray disc player).

The format adaptation steps (21, 22, 27, 29) may include color space conversion and/or color gamut mapping (and/or inverse color gamut mapping). Inverse color gamut mapping may be used, for example, when the three decoded components $\{\widehat{C_{20}^m}\}$ and the three components $\{C_{30}{}^m\}$ of an output image or the three components $\{C_{10}{}^m\}$ of an input image are represented in different color spaces and/or gamuts.

Usual format adapting processes may be used such as R'G'B'-to-Y'CbCr or Y'CbCr-to-R'G'B' conversions, BT.709-to-BT.2020 or BT.2020-to-BT.709, down-sampling or up-sampling chroma components, etc.

For example, SL-HDR1 may use format adapting processes and inverse gamut mapping as specified in Annex D of the ETSI technical specification TS 103 433-1 V1.2.1 (August 2017).

The input format adaptation step 21 may also include adapting the bit depth of the three components $\{C_{10}{}^m\}$ to bit depth such as 10 bits for example, by applying a transfer function on the three components $\{C_{10}{}^m\}$ such as a PQ or HLG transfer function or its inverse. The Recommendation Rec. ITU-R BT.2100 provides examples of such transfer functions.

In the pre-processing step 20, the three components $\{C_1{}^m\}$ are equal either to the three components $\{C_{10}{}^m\}$ when the format has not been adapted in step 21 or to adapted versions of these three components $\{C_{10}{}^m\}$ when the format of these components has been adapted in step 21. These three input components are decomposed into three components $\{C_{12}{}^m\}$ and a set of parameters SP formed by parameters coming from step 21, 200 and/or 203. The format of the three components $\{C_{12}{}^m\}$ may be optionally adapted during step 22 to get the three components $\{C_{120}{}^m\}$. A switching step 24 determines if the three components $\{C_{20}{}^m\}$ equals either the three components $\{C_{120}{}^m\}$ or the three components $\{C_1{}^m\}$.

In step 23, the three components $\{C_{20}{}^m\}$ may be encoded with any video codec and the output is a signal including the bitstream B. The output signal is carried throughout a distribution network.

According to variant of step 23, the set of parameters SP and/or the information data ID are conveyed as associated static and/or dynamic metadata in the bitstream B, or out-of-band.

According to a variant, the set of parameters SP and/or the information data ID are conveyed as associated static and/or dynamic metadata on a specific channel.

At least one signal, intended to be decoded by the apparatus A2 of FIG. 1, carries the bitstream B which can include the accompanying metadata.

In a variant, the bitstream B is stored on a storage medium such as a (UltraHD) Blu-ray disk or a hard disk or a memory of a Set-Top-Box for example.

In a variant, at least some accompanying associated metadata is stored on a storage medium such as an (UltraHD) Blu-ray disk or a hard disk or a memory of a Set-Top-Box for example.

In at least one implementation, in step 23, a sequence of at least one triplet of components $\{C_{20}{}^m\}$, each representing an image, and possibly associated metadata, are encoded with a video codec such as an H.265/HEVC codec or an H.264/AVC codec.

In step 25, the set of parameters SP is obtained at least partially either from the bitstream B or from another specific channel. At least one of the parameters of the set of parameters SP may also be obtained from a separate storage medium. Process parameters PP are derived from at least one of the parameters of the set of parameters SP. The process parameters can be modified in step 25 to adjust the image to luminance characteristics of the content and of the presentation display, as detailed in FIGS. 6 and 7.

In step 26, the three decoded components $\{\widehat{C_{20}^m}\}$ are obtained from the bitstream B.

The post-processing step 28 is a functional inverse, or substantially a functional inverse, of the pre-processing step 20. In the post-processing step 28, the three components $\{C_{30}{}^m\}$ are reconstructed from the three decoded components $\{\widehat{C_{20}^m}\}$ and the obtained set of parameters SP.

In more detail, the pre-processing step 20 includes steps 200-203.

In step 200, a component $C_{1,pre}{}^1$ is obtained by applying a mapping function on the component $C_1{}^1$ of the three components $\{C_1{}^m\}$. The component $C_1{}^1$ represents the luminance of the input image.

Mathematically speaking, $$C_{1,pre}{}^1 = MF(C_1{}^1) \tag{1}$$

with MF being a mapping function that may reduce or increase the dynamic range of the luminance of an image. Note that its inverse, denoted IMF, may increase or reduce, respectively, the dynamic range of the luminance of an image.

In step 202, a reconstructed component $\widehat{C_1^1}$ is obtained by applying an inverse-mapping function on the component $C_{1,pre}{}^1$:

$$\widehat{C_1^1} = IMF(C_{1,pre}{}^1) \tag{2}$$

where IMF is the functional inverse of the mapping function MF. The values of the reconstructed component $\widehat{C_1^1}$ belong thus to the dynamic range of the values of the component $C_1{}^1$.

In step 201, the components $C_{12}{}^2$ and $C_{12}{}^3$ are derived by correcting the components $C_1{}^2$ and $C_1{}^3$ representing the chroma of the input image according to the component $C_{1,pre}{}^1$ and the reconstructed component $\widehat{C_1^1}$.

This step 201 allows control of the colors obtained from the three components $\{C_{12}{}^m\}$ and allows perceptual matching to the colors of the input image. The correction of the components $C_1{}^2$ and $C_1{}^3$ (usually denoted chroma components) may be maintained under control by tuning the parameters of the chroma correcting and inverse mapping steps. The color saturation and hue obtained from the three components $\{C_{12}{}^m\}$ are thus under control. Such a control is not possible, usually, when a non-parametric mapping function (step 200) is used.

Optionally, in step 203, the component $C_{1,pre}{}^1$ may be adjusted to further control the perceived saturation, as follows:

$$C_{12}{}^1 = C_{1,pre}{}^1 - \max(0, a \cdot C_{12}{}^2 + b \cdot C_{12}{}^3) \quad (3)$$

where a and b are two parameters.

This step 203 allows control of the luminance (represented by the component $C_{12}{}^1$) to allow a perceived color matching between the colors (saturation and hue) obtained from the three components $\{C_{12}{}^m\}$) and the colors of the input image.

The set of parameters SP may include information data related to the mapping function or its inverse (steps 200, 202 and 282), information data related to the chroma correcting (steps 201 and 281), information data related to the saturation adjusting function, in particular their parameters a and b (step 203), and/or information related to the optional conversion used in the format adapting stages 21, 22, 27, 29 (for example gamut mapping and/or inverse gamut mapping parameters).

Figure 3:
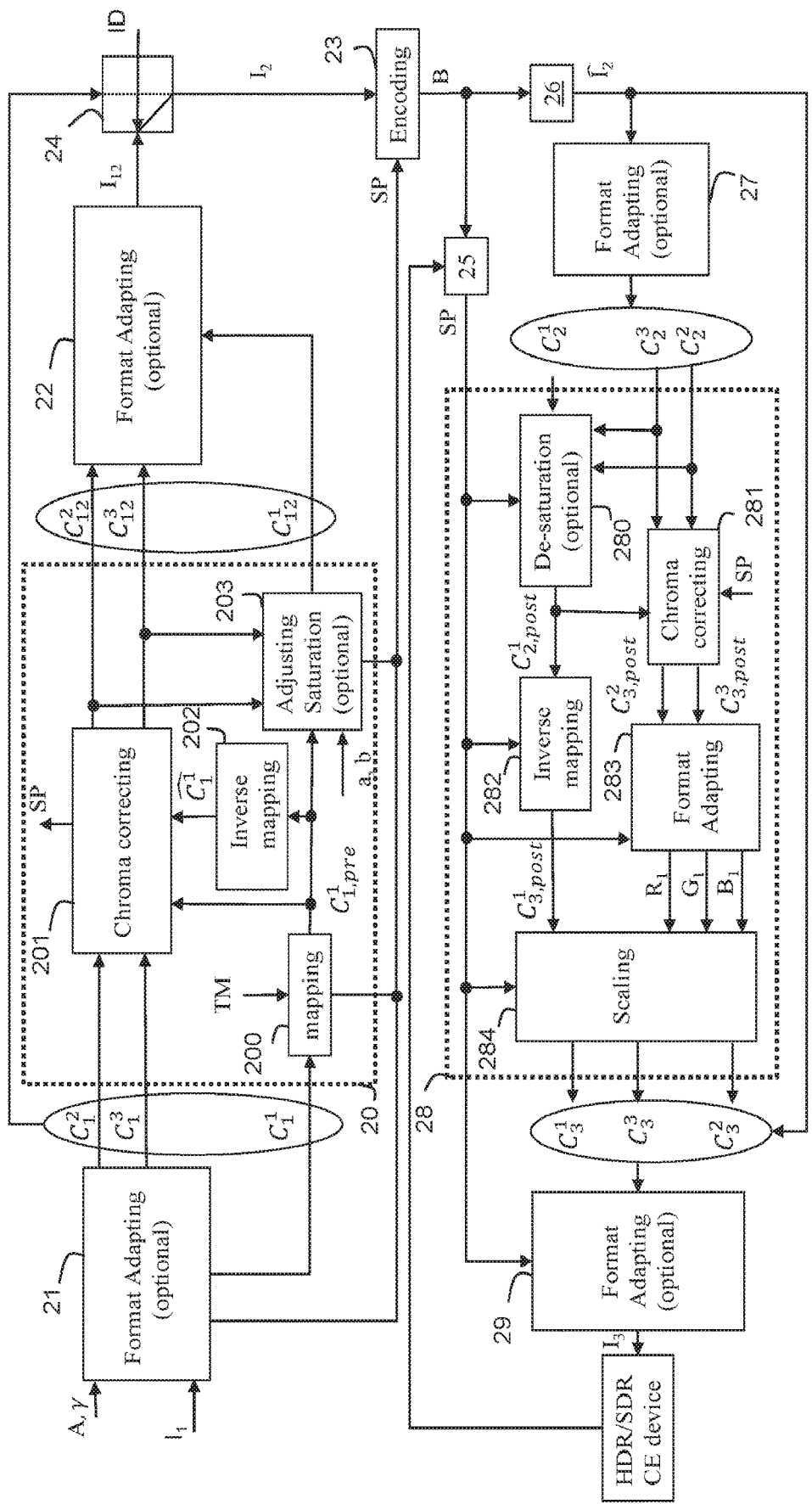
FIG. 3 shows a particular implementation of the workflow of FIG. 2.

The set of parameters SP may also include the information data ID and information characteristics of the output image, for example the format of the three components $\{C_{30}{}^m\}$ representative of the output image (steps 29 of FIGS. 2 and 3, 284 of FIG. 3).

In more details, the post-processing step 28 includes steps 280-282 which take as input at least one parameter of the set of parameters SP.

In optional step 280, the component $C_2{}^1$ of the three components $\{C_2{}^m\}$, output of step 27, may be adjusted as follows:

$$C_{2,post}{}^1 = C_2{}^1 + \max(0, a \cdot C_2{}^2 + b \cdot C_2{}^3) \quad (4)$$

where a and b are part of the process parameters PP and are derived from at least one parameter of the set of parameters SP.

For example, the step 280 is executed when the information data ID indicates that SL-HDR1 has to be considered and not executed when it indicates that SL-HDR2 has to be considered.

In step 282, the component $C_3{}^1$ of the three components $\{C_3{}^m\}$ is obtained by applying a mapping function on the component $C_2{}^1$ or, optionally, $C_{2,post}{}^1$:

$$C_3{}^1 = MF1(C_{2,post}{}^1) \quad (5)$$

where MF1 is a mapping function derived from at least one parameter of the set of parameters SP.

In step 281, the components $C_3{}^2$, $C_3{}^3$ of the three components $\{C_3{}^m\}$ are derived by inverse correcting the components $C_2{}^2$, $C_2{}^3$ of the three components $\{C_2{}^m\}$ according to the component $C_1{}^2$ or, optionally, $C_{2,post}{}^1$.

According to an embodiment, the components $C_2{}^2$ and $C_2{}^3$ are multiplied by a chroma correcting function $\beta(\cdot)$ as defined by parameters of the set of parameters SP and whose value depends on the component $C_2{}^1$ or, optionally, $C_{2,post}{}^1$.

Mathematically speaking, the components $C_3{}^2$, $C_3{}^3$ are given by:

$$\begin{bmatrix} C_3^2 \\ C_3^3 \end{bmatrix} = \beta(C_2^1) \begin{bmatrix} C_2^2 \\ C_2^3 \end{bmatrix} \quad (6)$$

or optionally, $$\begin{bmatrix} C_3^2 \\ C_3^3 \end{bmatrix} = \beta(C_{2,post}^1) \begin{bmatrix} C_2^2 \\ C_2^3 \end{bmatrix} \quad (6\text{bis})$$

FIG. 3 represents a hardware-friendly version of a single layer-based solution of FIG. 2. The version includes two additional steps 283 and 284 and allows a reduction in complexity for hardware implementations by reducing buses bitwidth use.

In step 283, three components denoted $(R_1, G_1, B_1)$ are obtained from components $C_{3,post}{}^2$ and $C_{3,post}{}^3$, outputs of the step 281, by taking into account parameters of the set of parameters SP:

$$\begin{bmatrix} R_1 \\ G_1 \\ B_1 \end{bmatrix} = \begin{bmatrix} 1 & 0 & m_0 \\ 1 & m_1 & m_2 \\ 1 & m_3 & 0 \end{bmatrix} \times \begin{bmatrix} S_0 \\ C_{3,post}^2 \\ C_{3,post}^3 \end{bmatrix}$$

where $m_0$, $m_1$, $m_2$, $m_3$ are part of the process parameters PP and are derived from at least one parameter of the set of parameters SP and $S_0$ is derived from the components $C_{3,post}{}^2$ and $C_{3,post}{}^2$ and other parameters of the set of parameters SP.

In step 284, the three components $\{C_3{}^m\}$ are then obtained by scaling the three components $(R_1, G_1, B_1)$ according to a component $C_{3,post}{}^1$, output of step 282.

$$\begin{cases} C_3^1 = C_{3,post}^1 \times R_1 \\ C_3^2 = C_{3,post}^1 \times G_1 \\ C_3^3 = C_{3,post}^1 \times B_1 \end{cases} \quad (7)$$

where $C_{3,post}{}^1 = MF1(C_{2,post}{}^1)$ (step 282).

According to a first embodiment of the end-to-end workflow of FIG. 2 or FIG. 3, the information data ID indicates that SL-HDR1 has to be considered.

The mapping function $MF(\cdot)$ in eq. (1) reduces the dynamic range of the luminance of the input image, its inverse $IMF(\cdot)$ in eq. (2) increases the dynamic range of the component $C_{1,pre}{}^1$, and the mapping function $MF1(\cdot)$ in eq. (5) increases the dynamic range of the component $C_{2,post}{}^1$.

According to a first variant of the first embodiment, the component $C_1{}^1$ is a non-linear signal, denoted luma in literature, which is obtained (step 21) from the gamma-compressed RGB components of the input image by:

$$C_1^1 = A_1 \begin{bmatrix} R^{1/\gamma} \\ G^{1/\gamma} \\ B^{1/\gamma} \end{bmatrix} \quad (8)$$

where $\gamma$ may be a gamma factor, equal to 2.4 in some implementations.

According to the first variant, the component $C_1{}^2$, $C_1{}^3$ are obtained (step 21), by applying a gamma compression to the RGB components of the input image:

$$\begin{bmatrix} C_1^2 \\ C_1^3 \end{bmatrix} = \begin{bmatrix} A_2 \\ A_3 \end{bmatrix} \begin{bmatrix} R^{1/\gamma} \\ G^{1/\gamma} \\ B^{1/\gamma} \end{bmatrix} \quad (9)$$

where $A=[A_1\ A_2\ A_3]^T$ is the canonical 3×3 R'G'B'-to-Y'CbCr conversion matrix (for example Recommendation ITU-R BT.2020-2 or Recommendation ITU-R BT.709-6 depending on the color space), $A_1$, $A_2$, $A_3$ being 1×3 matrices where $$A_1 = [A_{11} A_{12} A_{13}]$$

$$A_2 = [A_{21} A_{22} A_{23}]$$

$$A_3 = [A_{31} A_{32} A_{33}]$$

where $A_{mn}$ (m=1, ..., 3, n=1, ... 3) are matrix coefficients.

In step 201, according to the first variant, the components $C_1^2$ and $C_1^3$ are corrected from the ratio between the component $C_{1,pre}^1$ over the product of the gamma-compressed reconstructed component $\widehat{C_1^1}$ by $\Omega(C_{1,pre}^1)$:

$$\begin{bmatrix} C_{12}^2 \\ C_{12}^3 \end{bmatrix} = \frac{C_{1,pre}^1}{\Omega(C_{1,pre}^1)\widehat{C_1^1}^{1/\gamma}} \cdot \begin{bmatrix} C_1^2 \\ C_1^3 \end{bmatrix} \quad (10)$$

where $\Omega(C_{1,pre}^1)$ is a value that depends on the component $C_{1,pre}^1$ but may also be a constant value depending on the color primaries of the three components $\{C_1^m\}$. $\Omega(C_{1,pre}^1)$ may equal to 1.2 for Rec. BT.2020 for example. Possibly, $\Omega(C_{1,pre}^1)$ may also depend on parameters as specified in ETSI TS 103 433-1 V.1.2.1 clause C.2.3. $\Omega(C_{1,pre}^1)$ may also be a parameter of the set of parameters SP.

Further, according to the first variant, the three components $\{C_{120}^m\}$ may represent a Y'CbCr 4:2:0 gamma transfer characteristics video signal.

For example, the control parameters relative to the mapping function MF and/or its inverse IMF and/or the mapping function MF1(·) may be determined as specified in Clause C.3.2 (ETSI technical specification TS 103 433-1 V1.2.1). The chroma correcting function β(·) and their parameters may be determined as specified in Clause C.2.3 and C.3.4 (ETSI technical specification TS 103 433-1 V1.2.1). Information data related to the control parameters, information data related to the mapping functions or their inverse, and information data related to the chroma correcting function β(·) and their parameters, are parameters of the set of parameters SP. Examples of numerical values of the parameters of the set of parameters SP may be found, for example, in Annex F (Table F.1 of ETSI technical specification TS 103 433-1 V1.2.1).

The parameters $m_0$, $m_1$, $m_2$, $m_3$ and $S_0$ may be determined as specified in Clause 6.3.2.6 (matrixCoefficient[i] are defining $m_0$, $m_1$, $m_2$, $m_3$) and Clause 6.3.2.8 (kCoefficient[i] are used to construct $S_0$) of ETSI technical specification TS 103 433-1 V1.2.1 and their use for reconstruction may be determined as specified in Clause 7.2.4 (ETSI technical specification TS 103 433-1 V1.2.1). These parameters can be modified in step 25 to adjust the image to luminance characteristics of the content and of the presentation display, as detailed in FIGS. 6 and 7.

According to a second variant of the first embodiment, the component $C_1^1$ is a linear-light luminance component L obtained from the RGB component of the input image $I_1$ by:

$$C_1^1 = L = A_1 \begin{bmatrix} R \\ G \\ B \end{bmatrix} \quad (11)$$

According to the second variant, the component $C_1^2$, $C_1^3$ are derived (step 21) by applying a gamma compression to the RGB components of the input image $I_1$:

$$\begin{bmatrix} C_1^2 \\ C_1^3 \end{bmatrix} = \begin{bmatrix} A_2 \\ A_3 \end{bmatrix} \begin{bmatrix} R^{1/\gamma} \\ G^{1/\gamma} \\ B^{1/\gamma} \end{bmatrix} \quad (12)$$

According to the second variant, the component $C_{12}^2$, $C_{12}^3$ are derived (step 201) by correcting the components $C_1^2$, $C_1^3$ from the ratio between the first component $C_{1,pre}^1$ over the product of the gamma-compressed reconstructed component $\widehat{C_1^1}$ by $\Omega(C_{1,pre}^1)$.

$$\begin{bmatrix} C_{12}^2 \\ C_{12}^3 \end{bmatrix} = \frac{C_{1,pre}^1}{\Omega(C_{1,pre}^1) \cdot \widehat{C_1^1}^{1/\gamma}} \begin{bmatrix} C_1^2 \\ C_1^3 \end{bmatrix} \quad (13)$$

where $\Omega(C_{1,pre}^1)$ is a value that depends on the component $C_{1,pre}^1$ and, is possibly, obtained from parameters as specified in ETSI TS 103 433-1 V.1.2.1 clause C.3.4.2 where $$\Omega(C_{1,pre}^1) = \frac{1}{\text{Max}(R_{sgf}:255;\ R_{sgf} \cdot g(Y_n))}$$

in equation (22).

$\Omega(C_{1,pre}^1)$ may also be a parameter of the set of parameters SP.

Further, according to the second variant, the three components $\{C_{120}^m\}$ may represent a Y'CbCr 4:2:0 gamma transfer characteristics video signal.

For example, the control parameters related to the mapping function MF and/or its inverse IMF and/or the mapping function MF1(·) may be determined as specified in Clause C.3.2 (ETSI technical specification TS 103 433-1 V1.2.1). The chroma correcting function β(·) and their parameters may be determined as specified in Clause 7.2.3.2 (ETSI technical specification TS 103 433-2 V1.1.1) eq. (25) where $f_{sgf}(Y_n)=1$. Information data related to the control parameters, information data related to the mapping functions or their inverse, and information data related to the chroma correcting function β(·) and their parameters, are parameters of the set of parameters SP.

The parameters $m_0$, $m_1$, $m_2$, $m_3$ and $S_0$ may be determined as specified in Clause 6.3.2.6 (matrixCoefficient[i] are defining $m_0$, $m_1$, $m_2$, $m_3$) and Clause 6.3.2.8 (kCoefficient[i] are used to construct $S_0$) of ETSI technical specification TS 103 433-1 V1.2.1. Use of the parameters for reconstruction may be determined as specified in Clause 7.2.4 (ETSI technical specification TS 103 433-1 V1.2.1). These parameters can be modified in step 25 to adjust the image to luminance characteristics of the content and of the presentation display, as detailed in FIGS. 6 and 7.

According to a second embodiment of the end-to-end workflow of FIG. 2 or FIG. 3, the information data ID indicates that SL-HDR2 has to be considered.

In the second embodiment, the three components $\{C_1^m\}$ may be represented as a Y'CbCr 4:4:4 full range PQ10 (PQ 10 bits) video signal (specified in Rec. ITU-R BT.2100). The three components $\{C_{20}^m\}$, which represent PQ 10-bit image data and associated parameter(s) computed from the three components $\{C_1^m\}$ (typically 10, 12 or 16 bits), are provided. The provided components are encoded (step 23) using, for example an HEVC Main 10 profile encoding scheme. Those parameters are the set of parameters SP.

The mapping function MF1(·) in eq. (5) may increase or reduce the dynamic range of the component $C_{2,post}^1$ according to variants.

For example, the mapping function MF1(·) increases the dynamic range when the peak luminance of the connected HDR CE displays is above the peak luminance of the content. The mapping function MF1(·) decreases the dynamic range when the peak luminance of the connected HDR or SDR CE displays is below the peak luminance of the content. For example, the peak luminances may be parameters of the set of parameters SP.

For example, the control parameters related to the mapping function MF1 may be determined as specified in Clause C.3.2 (ETSI technical specification TS 103 433-1 V1.2.1). The chroma correcting function β(·) and their parameters may be determined as specified in Clause 7.2.3.2 (ETSI technical specification TS 103 433-2 V1.1.1) eq. (25) where $f_{sgf}(Y_n)=1$.

Information data related to the control parameters, information data related to the mapping function, and information data related to the chroma correcting function β(·) and their parameters, are parameters of the set of parameters SP. Examples of numerical values of the parameters of the set of parameters SP may be found, for example, in Annex F (Table F.1) (ETSI technical specification TS 103 433-2 V1.1.1).

The parameters $m_0$, $m_1$, $m_2$, $m_3$ (defined by matrixCoefficient[i] in ETSI technical specification TS 103 433-2 V1.1.1) and $S_0$ (constructed with kCoefficient[i] in ETSI technical specification TS 103 433-2 V1.1.1) may be determined as specified in Clause 7.2.4 (ETSI technical specification TS 103 433-2 V1.1.1). These parameters can be modified in step 25 to adjust the image to luminance characteristics of the content and of the presentation display, as detailed in FIGS. 6 and 7.

According to a first variant of the second embodiment, the three components $\{C_{30}^m\}$ representative of the output image are the three components $\{\widehat{C_{20}^m}\}$.

According to a second variant of the second embodiment, in the post-processing step 28, the three components $\{C_3\}$ are reconstructed from the three components $\{\widehat{C_{20}^m}\}$ and parameters of the set of parameters SP after decoding (step 25).

The three components $\{C_3^m\}$ are available for either an SDR or HDR enabled CE display. The format of the three components $\{C_3^m\}$ are possibly adapted (step 29) as explained above.

The mapping function MF(·) or MF1(·) is based on a perceptual transfer function. The goal of the perceptual transfer function is to convert a component of an input image into a component of an output image, thus reducing (or increasing) the dynamic range of the values of their luminance. The values of a component of the output image belong thus to a lower (or greater) dynamic range than the values of the component of an input image. The perceptual transfer function uses a limited set of control parameters.

Figure 4A:
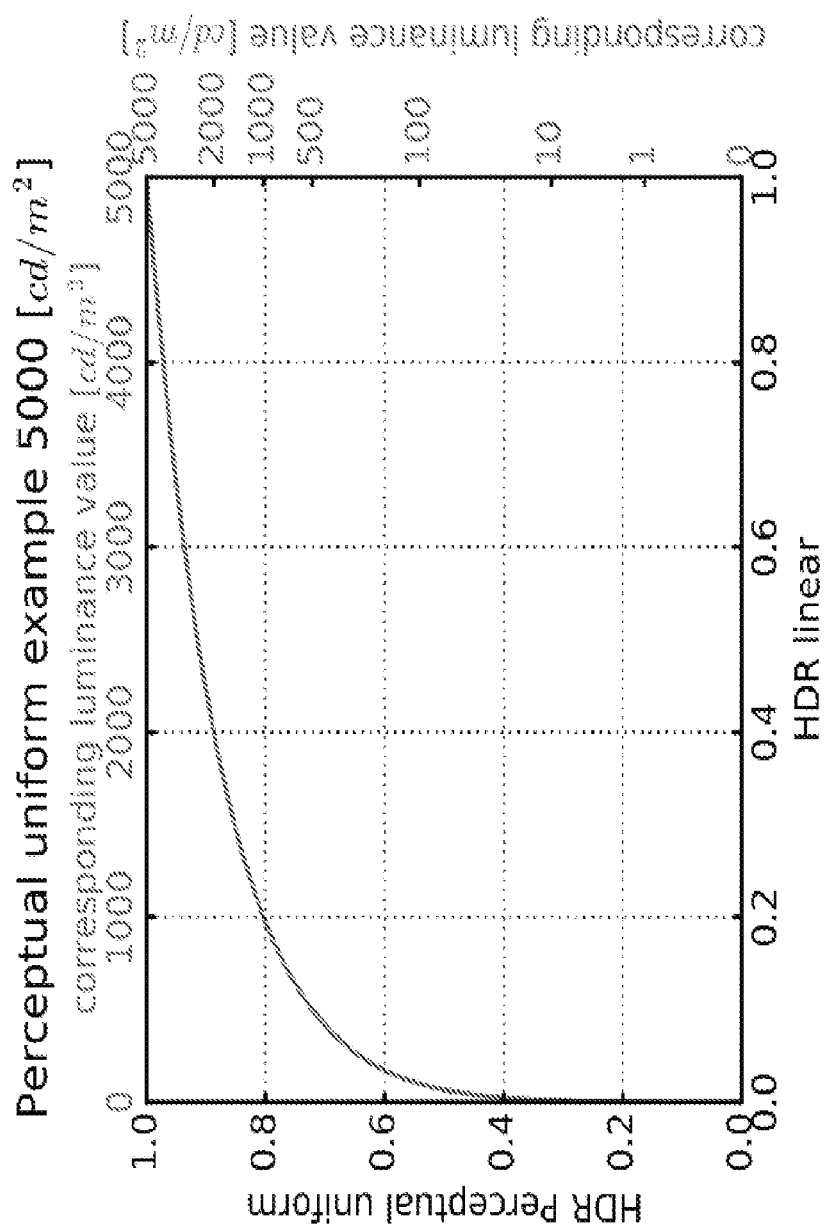
FIG. 4a shows an illustration of an example of perceptual transfer function.
Figure 4B:
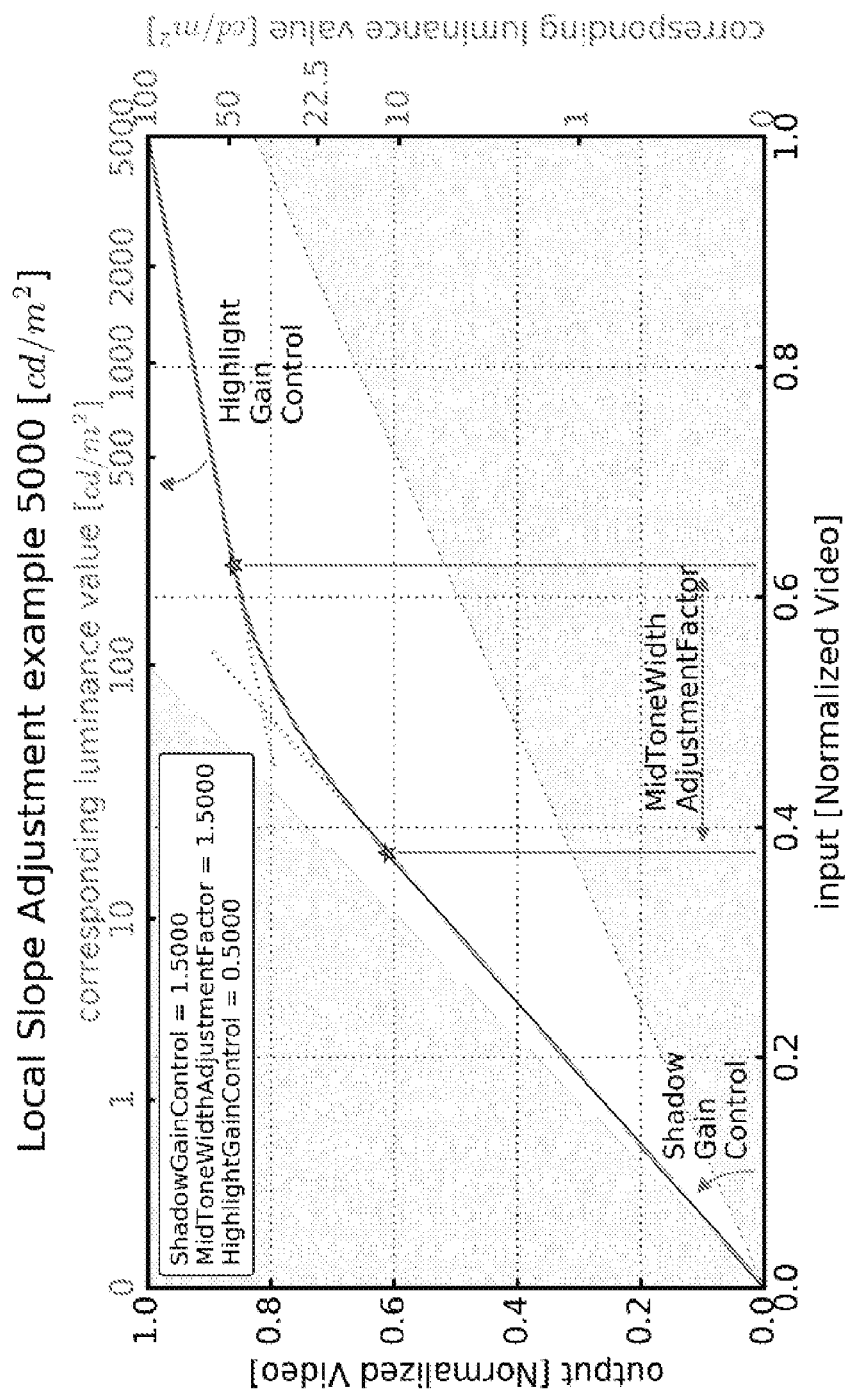
FIG. 4b shows an example of a piece-wise curve used for mapping.

FIG. 4*a* shows an illustration of an example of a perceptual transfer function that may be used for mapping luminance components but a similar perceptual transfer function for mapping the luminance component may be used. The mapping is controlled by a mastering display peak luminance parameter (equal to 5000 cd/m² in FIG. 4*a*). To better control the black and white levels, a signal stretching between content-dependent black and white levels is applied. Then the converted signal is mapped using a piece-wise curve constructed out of three parts, as illustrated in FIG. 4*b*. The lower and upper sections are linear, the steepness is determined by the shadowGain control and highlightGain control parameters respectively. The mid-section is a parabola providing a continuous and smooth bridge between the two linear sections. The width of the cross-over is determined by the midToneWidthAdjFactor parameter. All the parameters controlling the mapping may be conveyed as metadata for example by using an SEI message as specified in ETSI TS 103 433-1 Annex A.2 metadata.

Figure 4C:
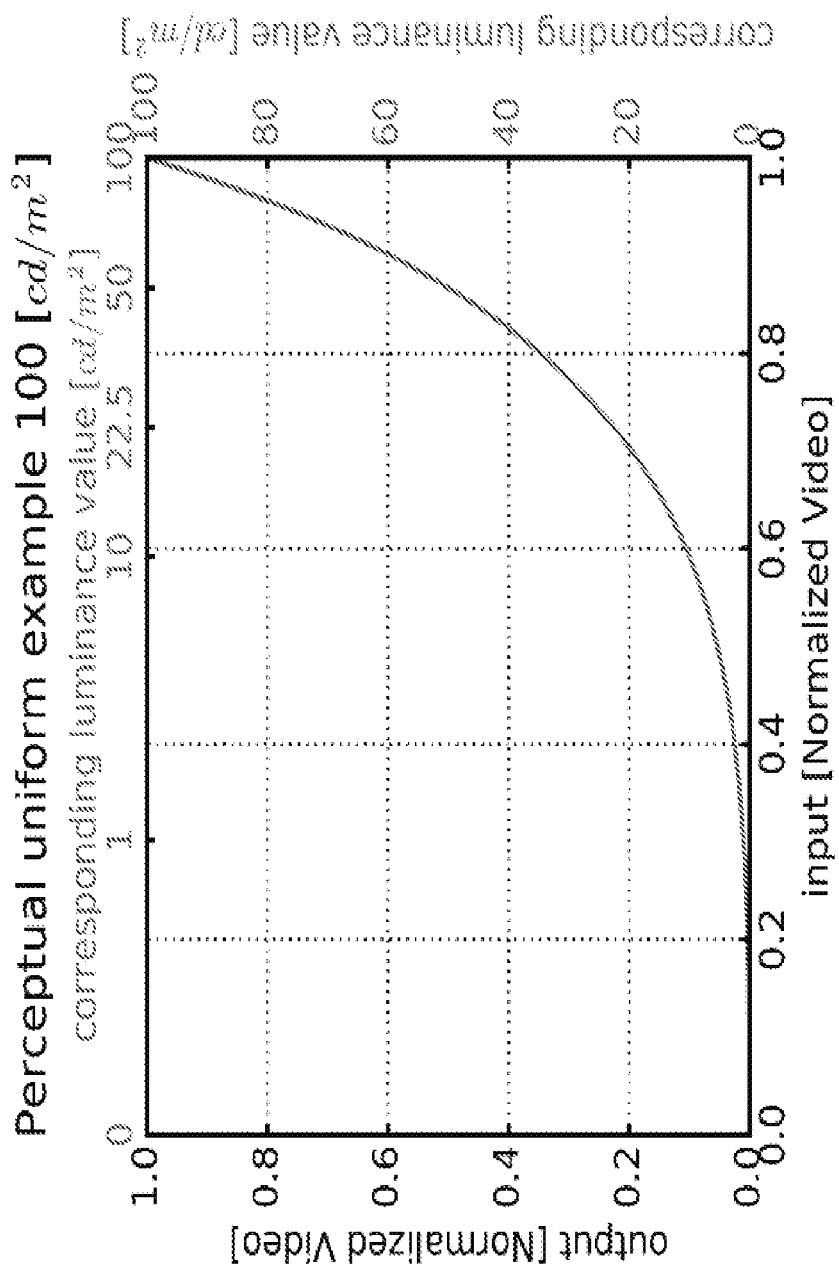
FIG. 4c shows an example of a curve used for converting a perceptual uniform signal to a linear-light domain.

FIG. 4*c* shows an example of the inverse of the perceptual transfer function TM (FIG. 4*a*) to illustrate how a perceptually optimized luminance signal may be converted back to the linear-light domain based on a targeted legacy display maximum luminance, for example 100 cd/m₂.

In step 25 (FIG. 2 or 3), the set of parameters SP is obtained to reconstruct the three components $\{C_3^m\}$ from the three components $\{\widehat{C_{20}^m}\}$. Process parameters PP used in the display adaptation process may be derived from metadata comprising the set of parameters SP and obtained from a bitstream, for example the bitstream B. The process parameters PP may further be modified in step 25 to adjust the image to luminance characteristics of the content and of the presentation display, as detailed in FIGS. 6 and 7.

ETSI TS 103 433-1 V1.2.1 clause 6 and Annex A.2 provide an example of syntax of the metadata. The syntax of this ETSI recommendation is described for reconstructing an HDR video from an SDR video but this syntax may extend to the reconstruction of any image from any decoded components. As an example, TS 103 433-2 V1.1.1 uses the same syntax for reconstructing a display adapted HDR video from an HDR video signal (with a different dynamic range).

According to ETSI TS 103 433-1 V1.2.1, the dynamic metadata may be conveyed according to either a so-called parameter-based mode or a table-based mode. The parameter-based mode may be of interest for distribution workflows that have a goal of, for example, providing direct SDR backward compatible services with very low additional payload or bandwidth usage for carrying the dynamic metadata. The table-based mode may be of interest for workflows equipped with low-end terminals or when a higher level of adaptation is required for representing properly both HDR and SDR streams. In the parameter-based mode, dynamic metadata to be conveyed include luminance mapping parameters representative of the inverse mapping function to be applied at the post-processing step, that is tmInputSignalBlackLevelOffset; tmInputSignalWhiteLevelOffset; shadowGain; highlightGain; midToneWidthAdjFactor; tmOutputFineTuning parameters.

Moreover, other dynamic metadata to be conveyed include color correction parameters (saturationGainNumVal, saturationGainX(i) and saturationGainY(i)) used to fine-tune the default chroma correcting function β(·) as specified in ETSI TS 103 433-1 V1.2.1 clauses 6.3.5 and 6.3.6.

The parameters a and b may be respectively carried in the saturationGain function parameters as explained above. These dynamic metadata may be conveyed using, for example, the HEVC SL-HDR Information (SL-HDRI) user data registered SEI message (see ETSI TS 103 433-1 V1.2.1 Annex A.2) or another extension data mechanism such as specified in the AVS2/IEEE1857.4 specification. Typical dynamic metadata payload size is less than 100 bytes per picture or scene.

Back to FIG. 3, in step 25, the SL-HDRI SEI message is parsed to obtain at least one parameter of the set of parameters SP. The process parameters PP used in the display adaptation process may be derived from metadata comprising the set of parameters SP. The process parameters PP may further be modified in step 25 to adjust the image to luminance characteristics of the content and of the presentation display, as detailed in FIGS. 6 and 7.

In step 282 and 202, the inverse mapping function (so-called lutMapY) is reconstructed (or derived) from the obtained mapping parameters (see ETSI TS 103 433-1 V1.2.1 clause 7.2.3.1 for more details; same clause for TS 103 433-2 V1.1.1).

In step 282 and 202, the chroma correcting function $\beta(\cdot)$ (so-called lutCC) is also reconstructed (or derived) from the obtained color correction parameters (see ETSI TS 103 433-1 V1.2.1 clause 7.2.3.2 for more details; same clause for TS 103 433-2 V1.1.1).

In the table-based mode, dynamic data to be conveyed include pivots points of a piece-wise linear curve representative of the mapping function. For example, the dynamic metadata are luminanceMappingNumVal that indicates the number of the pivot points, luminanceMappingX that indicates the abscissa (x) values of the pivot points, and luminanceMappingY that indicates the ordinate (y) values of the pivot points (see ETSI TS 103 433-1 V1.2.1 clauses 6.2.7 and 6.3.7 for more details). Moreover, other dynamic metadata to be conveyed may include pivots points of a piece-wise linear curve representative of the chroma correcting function $\beta(\cdot)$. For example, the dynamic metadata are colorCorrectionNumVal that indicates the number of pivot points, colorCorrectionX that indicates the x values of pivot points, and colorCorrectionY that indicates the y values of the pivot points (see ETSI TS 103 433-1 V1.2.1 clauses 6.2.8 and 6.3.8 for more details). These dynamic metadata may be conveyed using, for example, the HEVC SL-HDRI SEI message (mapping between clause 6 parameters and annex A distribution metadata is provided in Annex A.2.3 of ETSI TS 103 433-1 V1.2.1).

In step 25, the SL-HDRI SEI message is parsed to obtain the pivot points of a piece-wise linear curve representative of the inverse mapping function and the pivot points of a piece-wise linear curve representative of the chroma correcting function $\beta(\cdot)$, and the chroma to luma injection parameters a and b. These parameters are part of the process parameters PP used in the display adaptation process and may further be modified in step 25 to adjust the image to luminance characteristics of the content and of the presentation display, as detailed in FIGS. 6 and 7.

In step 282 and 202, the inverse mapping function is derived from those pivot points relative to a piece-wise linear curve representative of the inverse mapping function ITM (see ETSI TS 103 433-1 V1.2.1 clause 7.2.3.3 for more details; same clause for ETSI TS 103 433-2 V1.1.1).

In step 281 and 201, the chroma correcting function $\beta(\cdot)$, is also derived from those of the pivot points relative to a piece-wise linear curve representative of the chroma correcting function $\beta(\cdot)$ (see ETSI TS 103 433-1 V1.2.1 clause 7.2.3.4 for more details; same clause for TS 103 433-2 V1.1.1).

Note that static metadata also used by the post-processing step may be conveyed by SEI message. For example, the selection of either the parameter-based mode or table-based mode may be carried by the payloadMode information as specified by ETSI TS 103 433-1 V1.2.1 (clause A.2.2). Static metadata such as, for example, the color primaries or the maximum mastering display luminance are conveyed by a Mastering Display Colour Volume (MDCV) SEI message as specified in AVC, HEVC or embedded within the SL-HDRI SEI message as specified in ETSI TS 103 433-1 V1.2.1 Annex A.2.

According to an embodiment of step 25, the information data ID is explicitly signaled by a syntax element in a bitstream and thus obtained by parsing the bitstream. For example, the syntax element is a part of an SEI message such as sl_hdr_mode_value_minus1 syntax element contained in an SL-HDRI SEI message.

According to an embodiment, the information data ID identifies the processing that is to be applied to the input image to process the set of parameters SP. According to this embodiment, the information data ID may then be used to deduce how to use the parameters to reconstruct the three components $\{C_3^m\}$ (step 25).

For example, when equal to 1, the information data ID indicates that the set of parameters SP has been obtained by applying the SL-HDR1 pre-processing step (step 20) to an input HDR image, and that the three components $\{\widetilde{C_{20}^m}\}$ are representative of an SDR image. When equal to 2, the information data ID indicates that the parameters have been obtained by applying the SL-HDR2 pre-processing step (step 20) to an HDR 10 bits image (input of step 20), and that the three components $\{\widetilde{C_{20}^m}\}$ are representative of an HDR10 image.

According to an embodiment, the process parameters PP used in the display adaptation process may be derived from metadata comprising the set of parameters SP and obtained from a bitstream, for example the bitstream B. The process parameters PP may further be modified in step 25 to adjust the image to luminance characteristics of the content and of the presentation display, as detailed in FIGS. 6 and 7.

On FIGS. 1-4c and 6 the modules are functional units. In various embodiments, all, some, or none of these functional units correspond to distinguishable physical units. For example, these modules or some of them may be brought together in a unique component or circuit or contribute to functionalities of a software. As another example, some modules may be composed of separate physical entities. Various embodiments are implemented using either pure hardware, for example using dedicated hardware such as an ASIC or an FPGA or VLSI, respectively «Application Specific Integrated Circuit», «Field-Programmable Gate Array», «Very Large Scale Integration», or from several integrated electronic components embedded in an apparatus, or from a blend of hardware and software components.

Figure 5:
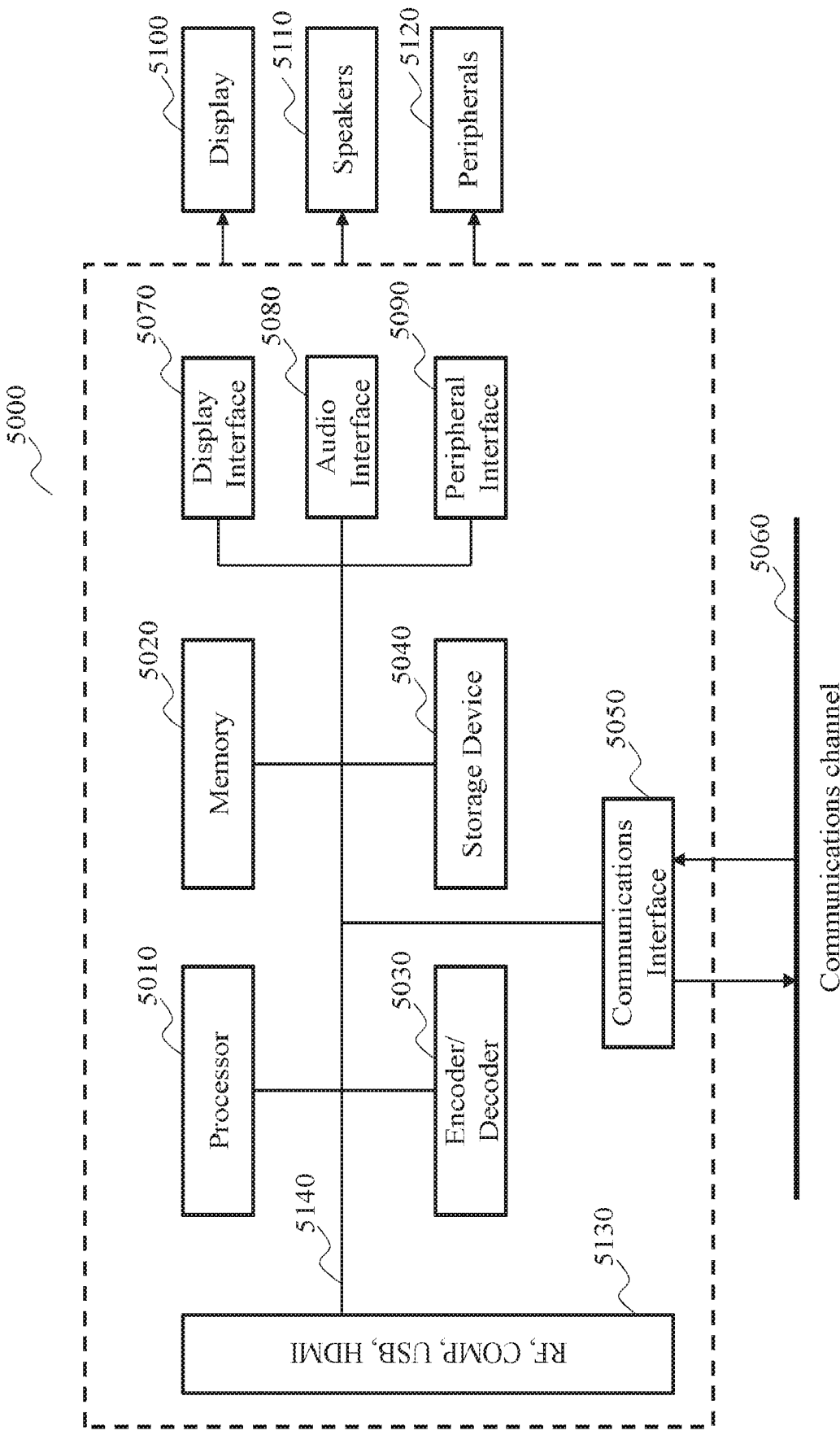
FIG. 5 illustrates a block diagram of an example of a system in which various aspects and embodiments are implemented.

FIG. 5 illustrates a block diagram of an example of a system in which various aspects and embodiments are implemented. System 5000 can be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 5000, singly or in combination, can be embodied in a single integrated circuit, multiple ICs, and/or discrete components. For example, in at least one embodiment, the processing and encoder/decoder elements of system 5000 are distributed across multiple ICs and/or discrete components. In various embodiments, the system 5000 is communicatively coupled to other similar systems, or to other electronic devices, via, for example, a communications bus or through dedicated input and/or output ports. In various embodiments, the system 5000 is configured to implement one or more of the aspects described in this document.

The system 5000 includes at least one processor 5010 configured to execute instructions loaded therein for implementing, for example, the various aspects described in this document. Processor 5010 can include embedded memory, input output interface, and various other circuitries as known in the art. The system 5000 includes at least one memory 5020 (e.g., a volatile memory device, and/or a non-volatile memory device). System 5000 includes a storage device 5040, which can include non-volatile memory and/or volatile memory, including, but not limited to, EEPROM, ROM, PROM, RAM, DRAM, SRAM, flash, magnetic disk drive, and/or optical disk drive. The storage device 5040 can include an internal storage device, an attached storage device, and/or a network accessible storage device, as non-limiting examples.

System 5000 includes an encoder/decoder module 5030 configured, for example, to process data to provide an encoded video or decoded video, and the encoder/decoder module 5030 can include its own processor and memory. The encoder/decoder module 5030 represents module(s) that can be included in a device to perform the encoding and/or decoding functions. As is known, a device can include one or both of the encoding and decoding modules. Additionally, encoder/decoder module 5030 can be implemented as a separate element of system 5000 or can be incorporated within processor 5010 as a combination of hardware and software as known to those skilled in the art.

Program code to be loaded onto processor 5010 or encoder/decoder 5030 to perform the various aspects described in this document can be stored in storage device 5040 and subsequently loaded onto memory 5020 for execution by processor 5010. In accordance with various embodiments, one or more of processor 5010, memory 5020, storage device 5040, and encoder/decoder module 5030 can store one or more of various items during the performance of the processes described in this document. Such stored items can include, but are not limited to, the input video, the decoded video or portions of the decoded video, a bitstream, matrices, variables, and intermediate or final results from the processing of equations, formulas, operations, and operational logic.

In several embodiments, memory inside of the processor 5010 and/or the encoder/decoder module 5030 is used to store instructions and to provide working memory for processing that is needed during encoding or decoding.

In other embodiments, however, a memory external to the processing device (for example, the processing device can be either the processor 5010 or the encoder/decoder module 5030) is used for one or more of these functions. The external memory can be the memory 5020 and/or the storage device 5040, for example, a dynamic volatile memory and/or a non-volatile flash memory. In several embodiments, an external non-volatile flash memory is used to store the operating system of a device. In at least one embodiment, a fast external dynamic volatile memory such as a RAM is used as working memory for video coding and decoding operations, such as for MPEG-2, HEVC, or VVC (Versatile Video Coding).

The input to the elements of system 5000 can be provided through various input devices as indicated in block 5030. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 5030 have associated respective input processing elements as known in the art. For example, the RF portion can be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband.

In one set-top box embodiment, the RF portion and its associated input processing element receives an RF signal transmitted over a wired (for example, cable) medium, and performs frequency selection by filtering, down-converting, and filtering again to a desired frequency band.

Various embodiments rearrange the order of the above-described (and other) elements, remove some of these elements, and/or add other elements performing similar or different functions.

Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 5000 to other electronic devices across USB and/or HDMI connections. It is to be understood that various aspects of input processing, for example, Reed-Solomon error correction, can be implemented, for example, within a separate input processing IC or within processor 5010 as necessary. Similarly, aspects of USB or HDMI interface processing can be implemented within separate interface ICs or within processor 5010 as necessary. The demodulated, error corrected, and demultiplexed stream is provided to various processing elements, including, for example, processor 5010, and encoder/decoder 5030 operating in combination with the memory and storage elements to process the data stream as necessary for presentation on an output device.

Various elements of system 5000 can be provided within an integrated housing. Within the integrated housing, the various elements can be interconnected and transmit data therebetween using suitable connection arrangement, for example, an internal bus as known in the art, including the 12C bus, wiring, and printed circuit boards.

The system 5000 includes communication interface 5050 that enables communication with other devices via communication channel 5060. The communication interface 5050 can include, but is not limited to, a transceiver configured to transmit and to receive data over communication channel 5060. The communication interface 5050 can include, but is not limited to, a modem or network card and the communication channel 5060 can be implemented, for example, within a wired and/or a wireless medium.

Data is streamed to the system 5000, in various embodiments, using a Wi-Fi network such as IEEE 802.11. The Wi-Fi signal of these embodiments is received over the communications channel 5060 and the communications interface 5050 which are adapted for Wi-Fi communications. The communications channel 5060 of these embodiments is typically connected to an access point or router that provides access to outside networks including the Internet for allowing streaming applications and other over-the-top communications.

Other embodiments provide streamed data to the system 5000 using a set-top box that delivers the data over the HDMI connection of the input block 5030.

Still other embodiments provide streamed data to the system 5000 using the RF connection of the input block 5030.

In some embodiments, the display 5100, speakers 5110 and peripherals 5120 are integrated into the system 5000. Television, tablet, and laptop are examples of such embodiments.

FIG. 6 illustrates an example of embodiment for adjusting the display adaption function according to content maximal average luminance and presentation display maximal average luminance. This figure simultaneously represents the architecture required to perform the adaptation and the corresponding method steps.

In step 600, the set of parameters SP are obtained either from the bitstream B or from another specific channel. In step 605, the process parameters PP are derived from the set of parameters. These process parameters include the parameters related to the post processing stage as described above (such as a, b, $m_0$, $m_1$, $m_2$, $m_3$) and used at least in one of the blocks 280, 281, 282, 283, 284 or 29 of FIG. 2 or FIG. 3. In step 610, a display maximal average luminance value is obtained from the display device. Information data representative of the luminance characteristics of consumer presentation display such as Average Peak Luminance (APL) or full white patch luminance may be carried through HDR Static Metadata Data Block specified in CTA-861-G and supported as an option since HDMI 2.0a., especially Desired Content Max Frame-average Luminance data but also Desired Content Max Luminance data and Desired Content Min Luminance data (Table 84 in section 7.5.13 of CTA-861-G see table 1 below). This information data may also be available into the presentation display register and it may be accessible to a metadata-guided display adaptation module located inside the presentation display itself. This information is hereafter referenced as $L_{mdisp}$.

TABLE 1

| Byte# | bits | | | | | | | |
|---|---|---|---|---|---|---|---|---|
| | 7 | 6 | 5 | 4 | 3 | 2 | 1 | 0 |
| 1 | Tag Code (0x07) | | | Length of following data block = n bytes | | | | |
| 2 | Extended Tag Code (0x06) | | | | | | | |
| 3 | F37 = 0 | F36 = 0 | ET_5 | ET_4 | ET_3 | ET_2 | ET_1 | ET_0 |
| 4 | SM_7 | SM_6 | SM_5 | SM_4 | SM_3 | SM_2 | SM_1 | SM_0 |
| 5 | Desired Content Max Luminance data (8 bits) | | | | | | | |
| 6 | Desired Content Max Frame-average Luminance data (8 bits) | | | | | | | |
| 7 | Desired Content Min Luminance data (8 bits) | | | | | | | |

In step 620, a content maximal average luminance value is obtained from the data representing the content, for example extracted from the set of parameters SP or directly by analyzing the content (e.g. by computing LightnessHDR as documented in clause C.3.2.3 and equation (C.46) of ETSI TS 103 433-1 v1.1.1). In step 630, these values may be compared together to decide if the display adaptation process parameters derived from the set of parameters (SP) need to be adjusted or not. The switch 640 is set in the appropriate position, so that the block 25 either provides adjusted PP parameters or non-adjusted PP parameters. In the first case, the set of parameters is adjusted in step 650 and provided to the other modules of the device in order to post-process (step 28 in FIG. 2 and FIG. 3) the content signal, for example in order to decode and display the video. In one embodiment, the parameters are systematically adjusted.

In an embodiment, the adjustment impacts at least one of the following parameters of SL-HDR1 or SL-HDR2 which are representative of a tone mapping curve used in the display adaptation process: shadowGain control parameters which controls low light mapping steepness, midToneWidthAdjFactor parameters which controls the transition between low light and bright light mapping typically in the skin tone related area or highlightGain control parameters that controls bright light (specular light) mapping (see FIG. 4b).

In an embodiment, the display maximal average luminance is obtained from the Desired Content Max Frame-average Luminance value carried over table 1 above and the content maximal average luminance is represented by the maximum frame-average lightness level (MaxFALL—specified in annex P of CTA-861-G) of the content. MaxFALL may be present in content light information SEI message carried along the coded stream or in Static Metadata Type 1 of CTA-861-G (section 6.9.1) carried in Dynamic Range and Mastering InfoFrame.

When MaxFALL information data is not available, another value representative of the average luminance of the content may be used such as the geometric mean of the mastering display minimum luminance, mastering display maximum luminance and input HDR image average luminance values may be considered (that might be obtained by a content histogram analysis module such as already implemented in current TV image processing pipeline). Alternatively, the content maximal average luminance is represented by a reference white level (e.g. reference white or HDR reference white or diffuse white or graphic white such as documented in ITU-R Recommendation BT.2408-1 "Operational Practices in HDR Television Production", 04/2018).

In an embodiment, the decision step 630 comprises a direct comparison of values and it is decided to adapt the set of parameters in the case where the content is brighter than what the display can handle, i.e. when MaxFALL>$L_{mdisp}$.

In an embodiment, the decision step 630 comprises a weighting factor of the values before direct comparison and it is decided to adapt the set of parameters in the case where the content is brighter than a weighted value of what the display can handle, i.e. when MaxFALL>α.$L_{mdisp}$, with α in the range of 0.5 to 2. This weighting allows to adjust the decision according to characteristics of the presentation display. Typically, an OLED display and a LED display are two different technologies fed by two different power consumption policies inherently dependent on their technology design. Average Peak Luminance driving may react differently for each display technology and the a scale factor accounts for the difference.

In an embodiment, the presentation display maximal average luminance ($L_{mdisp}$) value is combined with content MaxFALL as a modulation function of the shadow gain control portion of the tone mapping portion in the SL-HDRx display adaptation process and recomputed parameters for display adaptation may be modulated by the modulation function as follows.

In a first embodiment, a scaling factor can be determined and use as modulation function:

$$fmod(MaxFALL; L_{mdisp}) = \begin{cases} \frac{L_{mdisp}}{\alpha \cdot MaxFALL}, & \text{if } L_{mdisp} < \alpha \cdot MaxFALL \\ 1, & \text{otherwise} \end{cases}$$

where $L_{mdisp}$ is the maximum frame-average luminance of the presentation display. Typically, this value is retrieved from Desired Content Max Frame-average Luminance field of HDR Static Metadata Data Block (CTA-861-G), Max-FALL is the maximum frame-average light level of the input HDR content (this value is typically retrieved from Content Light Level Information SEI message) and the weighting factor α is typically in the range [0.5; 2]

In a variant of first embodiment:

$$fmod(MaxFALL; L_{mdisp}) = v\left(\frac{L_{mdisp}}{MaxFALL}; MaxFALL\right)$$

In a second variant of first embodiment, scaling factors used to modulate parameters representative of the tone mapping curves and based on coordinates of MaxFALL or $L_{mdisp}$ in the tone mapping curve representation.

$$\text{With } \delta = v\left(\frac{L_{HDR}}{L_{mdisp}}; L_{mdisp}\right) \text{ and } \varepsilon = v\left(\frac{L_{HDR}}{MaxFALL}; MaxFALL\right)$$

Scale factors may be defined from ratio of these coordinates and K and A respectively defined in equations (E.1) and (E.2) of TS 103 433-1 v1.2.1. For example:

$$scaleFactor1 = \frac{(\delta - 1) \times (\kappa + 1)}{(\delta + 1) \times (\kappa - 1)} \text{ or } scaleFactor2 = \frac{(\delta - 1) \times (\varepsilon + 1)}{(\delta + 1) \times (\varepsilon - 1)}$$

Then, the modulation function is applied (as a factor) to recomputed $SGC_{DA}$ in equation (E.11) of TS 103 433-1 v1.2.1:

$$SGC_{DA} = \frac{MIDY_{DA}}{MIDX_{DA}} \times fmod(MaxFALL; L_{mdisp})$$

In an alternate embodiment, equation (C.52) of clause C.3.2.3 is modulated by the modulation function.

In an alternate embodiment, shadowGain is computed as documented in clause C.3.2.3 except that equation (C.52) is modified as follows:

$$LightnessHDR = v\left(\frac{MaxFALL}{L_{HDR}}; L_{HDR}\right)$$

$$LightnessHDRHigh = v\left(\frac{L_{mdisp}}{L_{HDR}}; L_{HDR}\right)$$

Alternatively, above and in the rest of the document $$v\left(\frac{L_{mdisp}}{L_{HDR}}; L_{HDR}\right)$$

is replaced by $$v\left(\frac{L_{mdisp}}{L_{pdisp}}; L_{pdisp}\right).$$

In an example of such embodiment, other recomputed display adaptation parameters (e.g. $para_{DA}$, $highlighGain_{DA}$, $midToneWidthAdjFactor_{DA}$) are kept as documented in equations (E.12) to (E.16).

In at least one embodiment, recomputed display adaptation parameters are modulated by the modulation function as proposed in the invention only when presentation display maximal average luminance value $L_{mdisp}$ is less than content MaxFALL multiplied by a factor comprised between 0.5 and a positive value higher than 1 (e.g. 2). Indeed, in that case, content may not be displayed as intended because the presentation display may apply restrictions in terms of emitted light from the panel and the invention allows then to retain maximum of the content artistic intent considering the energy restrictions when adapting the content. Indeed, the display adaptation parameters are scaled in a perceptual uniform domain, the scaling being dependent on the actual capabilities of the display relatively to its power consumption control. Besides, the intent of the application is to not change display adaptation parameters of the adaptation function (e.g.: tone mapping curve) when the content maximum frame-average luminance is compatible with presentation display energy policy (i.e. when MaxFALL is somehow less than the maximal average luminance value of the presentation display). In such a case, equations of annexes E of SL-HDR1 and clause 7 of SL-HDR2 are left unchanged (i.e. step 640 of FIG. 6 bypasses the adaptation step 650). The intent is that when the content is too bright in average against the display capabilities (in terms of full white patch)

then, the display adaptation tone mapping compresses or scales accordingly the tone mapping curve (using a more aggressive tone mapping) so that the display adapted and modulated content would be tone mapped in a more controlled manner. Indeed, when the display adaptation tone mapping curve is not adapted, the content will be tone mapped by the presentation display so that energy policy is met which leads to uncontrolled result.

In other variant embodiments, the modulation function may apply to other parameters representative of another portion of the tone mapping curve. For example, the modulation function may be applied on the appropriate parameters of annex E (e.g.: $para_{DA}$, $highlighGain_{DA}$, $midToneWidthAdjFactor_{DA}$) similarly to the detailed equations above.

The proposed principles may be extended to any other analytical tone mapping curve.

FIG. 7 illustrates the adjustment of a tone mapping curve according to a second embodiment where content maximal average luminance and display maximal average luminance are matched. Tone mapping is one example of function used within the adaptation process. Considering Equation (C.20) of ETSI TS 103 433-1:

$$TMO(x) = \begin{cases} SGC \times x, & 0 \le x \le x_{SGC} \\ ax^2 + bx + c, & x_{SGC} < x < x_{HGC} \\ HGC \times x + 1 - HGC, & x_{HGC} \le x \le 1 \end{cases}$$

When considering $$x = v\left(\frac{MaxFALL}{L_{HDR}}; L_{HDR}\right) \text{ and } y = v\left(\frac{L_{mdisp}}{L_{HDR}}; L_{HDR}\right)$$

in the first portion of the tone mapping curve where y=SGC×x, one deduces:

$$SGC = \frac{v\left(\frac{L_{mdisp}}{L_{HDR}}; L_{HDR}\right)}{v\left(\frac{MaxFALL}{L_{HDR}}; L_{HDR}\right)}$$

where:

$L_{mdisp}$ is the maximum frame-average luminance of the presentation display. Typically, this value is retrieved from Desired Content Max Frame-average Luminance field of HDR Static Metadata Data Block (CTA-861-G) and MaxFALL is the maximum frame-average light level of the input HDR content. Typically, this value is retrieved from Content Light Level Information SEI message. Other parameters a, b, c and HGC are documented in clause C.2.2.4 of TS 103 433-1.

In a first variant of this second embodiment, shadowGain parameter is computed from equation (C.27) and (C.23):

$$shadowGain = 4 \times \left(\frac{SGC}{expgain} - 0,5\right)$$

where expgain is given by (C.24).

HGC is fixed (pre-determined) and coming from the incoming metadata (used in SDR to HDR reconstruction for SL-HDR1, or just coming from metadata for SL-HDR2), midToneWidthAdjFactor is recomputed from (C.2) and SGC equation above:

$$midToneWidthAdjFactor = \\ 2 \times \left(\frac{1 - HGC}{\frac{v\left(\frac{L_{mdisp}}{L_{HDR}}; L_{HDR}\right)}{v\left(\frac{MaxFALL}{L_{HDR}}; L_{HDR}\right)} - HGC} - v\left(\frac{MaxFALL}{L_{HDR}}; L_{HDR}\right)\right)$$

In other variants of the second embodiment, instead of matching $L_{mdisp}$ with MaxFALL, $L_{mdisp}$ is matched with particular point of the tone mapping curve for instance junctions between portion of the curve:

x_SGC as defined in equation (C.22) of TS 103 433-1
x_HGC as defined in equation (C.22) of TS 103 433-1.

The system 5000 can provide an output signal to various output devices, including a display 5100, speakers 5110, and other peripheral devices 5120. The other peripheral devices 5120 include, in various examples of embodiments, one or more of a stand-alone DVR, a disk player, a stereo system, a lighting system, and other devices that provide a function based on the output of the system 5000.

In various embodiments, control signals are communicated between the system 5000 and the display 5100, speakers 5110, or other peripheral devices 5120 using signaling such as AV.Link, CEC, or other communications protocols that enable device-to-device control with or without user intervention.

The output devices can be communicatively coupled to system 5000 via dedicated connections through respective interfaces 5070, 5080, and 5090.

Alternatively, the output devices can be connected to system 5000 using the communications channel 5060 via the communications interface 5050. The display 5100 and speakers 5110 can be integrated in a single unit with the other components of system 5000 in an electronic device such as, for example, a television.

In various embodiments, the display interface 5070 includes a display driver, such as, for example, a timing controller (T Con) chip.

The display 5100 and speaker 5110 can alternatively be separate from one or more of the other components, for example, if the RF portion of input 5130 is part of a separate set-top box. In various embodiments in which the display 5100 and speakers 5110 are external components, the output signal can be provided via dedicated output connections, including, for example, HDMI ports, USB ports, or COMP outputs.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, any other device for processing an image or a video, and any other communication apparatus. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage media, is merely an illustrative and not exhaustive listing as is readily appreciated by one of ordinary skill in the art: a portable computer; a floppy disk; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium (also referred to as a computer readable medium or a computer readable storage medium). Instructions may be, for example, in hardware, firmware, software, or a combination. Instructions may be found in, for example, an operating system, a separate application, or a combination of the two. A processor may be characterized, therefore, as, for example, both an apparatus configured to carry out a process and an apparatus that includes a processor-readable medium (such as a storage apparatus) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described example, or to carry as data the actual syntax-values written by a described example. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

In an embodiment of the first aspect, the parameters are adjusted only when the second value is greater than the first value. In an embodiment of the first aspect, the first value is the Desired Content Max Frame-average Luminance of the display device that will display the image. In an embodiment of the first aspect, the second value is the Content Max Frame-average Luminance of the image to be displayed. In an embodiment of the first aspect, the first value is the Desired Content Max Frame-average Luminance of the display device that will display the image and the second value is the Content Max Frame-average Luminance of the image to be displayed. In an embodiment of the first aspect, the adapting function is a tone mapping function and the adjustment of the parameters of the adapting function comprises applying a first scaling factor equal to the ratio between the first value and the second value. In an embodiment of the first aspect, the adapting function is a tone mapping function and adapting the tone mapping function comprises defining a new perceptual tone mapping function comprising at least a lower linear section defined by a steepness equal to the ratio between the first value and the second value. In an embodiment of the first aspect, one of the first or second value is scaled according to a second scaling factor. In an embodiment of the first aspect, the value of the second scaling factor is comprised in a range of 0.5 to 2.0.

In an embodiment of the second aspect, the parameters are adjusted only when the second value is greater than the first value. In an embodiment of the second aspect, the first value is the Desired Content Max Frame-average Luminance of the display device that will display the image. In an embodiment of the second aspect, the second value is the Content Max Frame-average Luminance of the image to be displayed. In an embodiment of the second aspect, the first value is the Desired Content Max Frame-average Luminance of the display device that will display the image and the second value is the Content Max Frame-average Luminance of the image to be displayed. In an embodiment of the second aspect, the adapting function is a tone mapping function and the adjustment of the parameters of the adapting function comprises applying a first scaling factor equal to the ratio between the first value and the second value. In an embodiment of the second aspect, the adapting function is a tone mapping function and adapting the tone mapping function comprises defining a new perceptual tone mapping function comprising at least a lower linear section defined by a steepness equal to the ratio between the first value and the second value. In an embodiment of the second aspect, one of the first or second value is scaled according to a second scaling factor. In an embodiment of the second aspect, the value of the second scaling factor is comprised in a range of 0.5 to 2.0.

The invention claimed is:

1. A method for decoding an image comprising:
   obtaining parameters of an inverse tone mapping function, and
   decoding the image wherein the decoding comprises at least applying the inverse tone mapping function to the image based on obtained parameters, the inverse tone mapping function comprising at least a lower linear section defined by a steepness value,
   wherein when a first value representative of a maximal average luminance parameter of a display device that will display the image is smaller than a second value representative of an average luminance of the image to be displayed, the inverse tone mapping parameters are adjusted by scaling the steepness value based on a ratio between the first value and a weighted value of the second value and wherein the weight is in the range of 0.5 to 2.

2. The method of claim 1, wherein the first value is the Desired Content Max Frame-average Luminance of the display device according to HDR Static Metadata Data Block of CTA-861-G.

3. The method of claim 1, wherein the first value is a weighted value of the Desired Content Max Frame-average Luminance according to HDR Static Metadata Data Block of CTA-861-G.

4. The method of claim 1, wherein the second value representative of an average luminance of the image to be displayed is:
- a maximum frame-average lightness level MaxFALL according to annex P of CTA-861-G of the content,
- a reference white level or diffuse white according to ITU-R Recommendation BT.2408-1, or
- a geometric mean of the mastering display minimum luminance, mastering display maximum luminance, and image average luminance values.

5. The method of claim 1, wherein the first value is obtained from the display device.

6. A non-transitory processor-readable medium whose program code instructions execute the steps of the method according to claim 1 when executed on a computer.

7. An apparatus for decoding an image comprising at least one processor configured to:
- obtain parameters of an inverse tone mapping function, and
- decode the image by at least applying the inverse tone mapping function to the image based on obtained parameters, the inverse tone mapping function comprising at least a lower linear section defined by a steepness value, wherein when a first value representative of a maximal average luminance parameter of a display device that will display the image is smaller than a second value representative of an average luminance of the image to be displayed, the inverse tone mapping parameters are adjusted by scaling the steepness value based on a ratio between the first value and a weighted value of the second value and wherein the weight is in the range of 0.5 to 2.

8. The apparatus of claim 7, wherein the first value is the Desired Content Max Frame-average Luminance of the display device according to HDR Static Metadata Data Block of CTA-861-G.

9. The apparatus of claim 7, wherein the second value representative of an average luminance of the image to be displayed is:
- a maximum frame-average lightness level MaxFALL according to annex P of CTA-861-G of the content,
- a reference white level or diffuse white according to ITU-R Recommendation BT.2408-1, or
- a geometric mean of the mastering display minimum luminance, mastering display maximum luminance, and image average luminance values.

10. The apparatus of claim 7, wherein the first value is a weighted value of the Desired Content Max Frame-average Luminance according to HDR Static Metadata Data Block of CTA-861-G.

11. The apparatus of claim 7, wherein the first value is obtained from the display device.

* * * * *